United States Patent
Itoh

(10) Patent No.: US 8,294,943 B2
(45) Date of Patent: Oct. 23, 2012

(54) PRINT CONTROL APPARATUS AND PRINTING SYSTEM

(75) Inventor: Kenji Itoh, Hirakata (JP)

(73) Assignee: Sharp Kabushiki Kaisha, Osaka (JP)

( * ) Notice: Subject to any disclaimer, the term of this patent is extended or adjusted under 35 U.S.C. 154(b) by 964 days.

(21) Appl. No.: 12/109,054

(22) Filed: Apr. 24, 2008

(65) Prior Publication Data

US 2008/0266600 A1    Oct. 30, 2008

(30) Foreign Application Priority Data

Apr. 27, 2007  (JP) ................ 2007-120205

(51) Int. Cl.
| H04N 1/40 | (2006.01) |
| H04N 1/60 | (2006.01) |
| G06K 15/02 | (2006.01) |
| G06K 15/00 | (2006.01) |
| H04M 1/64 | (2006.01) |
| G03G 15/00 | (2006.01) |

(52) U.S. Cl. .......... 358/1.18; 358/1.15; 358/3.29; 358/1.11; 358/1.16; 358/1.9; 379/88.28; 399/46

(58) Field of Classification Search ............. 358/1.15, 358/400, 1.13, 1.14; 382/100
See application file for complete search history.

(56) References Cited

U.S. PATENT DOCUMENTS

| 5,566,372 A * | 10/1996 | Ikeda et al. ............... 399/46 |
| 5,896,490 A * | 4/1999 | Hayama et al. ........... 358/3.29 |
| 6,029,165 A * | 2/2000 | Gable ........................ 1/1 |
| 6,181,433 B1 * | 1/2001 | Hayama et al. ........... 358/1.12 |
| 6,259,773 B1 * | 7/2001 | Sato et al. ................. 379/88.28 |
| 6,744,905 B1 * | 6/2004 | Horiike ..................... 382/100 |
| 7,085,006 B2 | 8/2006 | Yokoyama et al. |
| 7,292,369 B2 * | 11/2007 | Yokoyama et al. ........ 358/1.9 |
| 7,336,799 B2 * | 2/2008 | Matsumura et al. ...... 382/100 |
| 7,428,074 B2 * | 9/2008 | Kitahara et al. .......... 358/1.18 |
| 2002/0089514 A1 | 7/2002 | Kitahara et al. |
| 2002/0089686 A1 | 7/2002 | Kitahara et al. |
| 2002/0097436 A1 | 7/2002 | Yokoyama et al. |
| 2002/0175958 A1 * | 11/2002 | Natori ........................ 347/5 |
| 2003/0002060 A1 | 1/2003 | Yokoyama et al. |
| 2003/0002063 A1 * | 1/2003 | Oomura et al. .......... 358/1.11 |
| 2003/0231345 A1 * | 12/2003 | Azami ....................... 358/1.18 |
| 2006/0221358 A1 * | 10/2006 | Takahashi ................. 358/1.1 |
| 2008/0013112 A1 | 1/2008 | Yokoyama et al. |

FOREIGN PATENT DOCUMENTS

| CN | 1709709 A | 12/2005 |
| JP | 9-86015 A | 3/1997 |
| JP | 2001-245136 A | 9/2001 |

(Continued)

*Primary Examiner* — Akwasi M Sarpong
(74) *Attorney, Agent, or Firm* — Birch, Stewart, Kolasch & Birch, LLP

(57) ABSTRACT

A print control apparatus includes a command section for causing a printing apparatus to execute a print job, the print job for printing a print subject image on a sheet, with a mark overlaying the sheet. Furthermore, the print control apparatus includes: an accepting section that accepts a processing condition for an image process of the mark, during a processing condition accepting period, which is set for every print job and is the period before an input of an executive instruction; and an image processing section that performs the image process of the mark in accordance with the processing condition during the processing condition accepting period. This makes it possible to prevent delay in initiation of printing, without excessive consumption of storage capacity of a storage device.

9 Claims, 13 Drawing Sheets

FOREIGN PATENT DOCUMENTS

| | | |
|---|---|---|
| JP | 2002-269550 A | 9/2002 |
| JP | 2002-312137 A | 10/2002 |
| JP | 2004-236044 A | 8/2004 |
| JP | 2005-212120 A | 8/2005 |

* cited by examiner

PRINT CONTROL APPARATUS AND PRINTING SYSTEM

This Nonprovisional application claims priority under 35 U.S.C. §119(a) on Patent Application No. 120205/2007 filed in Japan on Apr. 27, 2007, the entire contents of which are hereby incorporated by reference.

BACKGROUND OF THE INVENTION

1. Field of the Invention

The present invention relates to a print control apparatus enabling a printer to execute a print job for printing on a sheet a print subject image and a stamp mark in a superimposed manner.

2. Description of the Related Art

When a printer prints an image prepared by a terminal equipment or an image scanned by a scanner (such images are hereafter referred to as print subject images), a stamp mark can be printed on at least a part of the print subject image based on a setting for the stamp mark by a user.

Such a stamp mark is combined with the print subject image as follows. Namely, before an executive instruction for a print job is entered, a user sets image processing conditions, such as a scaling factor and/or a rotation angle, for the stamp mark. After the executive instruction for the print job is entered, image processes such as a scale process and/or a rotation process, is carried out with respect to the stamp mark in accordance with the image processing conditions. This allows the stamp mark to be combined with the print subject image. Thereafter, a printing process is performed.

According to the printing in which the stamp mark is combined, the image processes are carried out with respect to the stamp mark after the executive instruction for the print job is entered. This causes a problem that the initiation of printing is delayed because the time required from the entering of the executive instruction to the initiation of printing becomes longer by the time required for carrying out the image processes with respect to the stamp mark.

In order to address the problem, Patent Document 1 discloses an image forming apparatus in which a plurality of stamp marks, each having a different scaling factor and a different rotation angle, are prepared from a single original stamp mark by performing plural image processes with respect to the single original stamp mark under various image processing conditions and the plurality of stamp marks thus prepared are stored (registered) in a storage device such as a hard disk.

According to the image forming apparatus disclosed in Patent Document 1, a stamp mark is read out from the storage device when the storage device stores the stamp mark that has been processed under the same image processing condition(s) as the processing condition(s) entered by a user. Subsequently, the stamp mark thus read out is combined with the print subject image. Thereafter, printing is executed. Therefore, the image processing apparatus can prepare a stamp mark that has already been subjected to the image processes at the time when the print instruction is entered. This reduces the time required from the entering of the executive instruction to the initiation of print process. As a result, it is possible to prevent delay in the initiation of printing.

(Patent Document 1)

Japanese Unexamined Patent Publication No. 2005-212120 (Tokukai 2005-212120 (Date of publication: Aug. 11, 2005))

The image processing condition(s) entered by a user differs from print job to print job. Therefore, in order to avoid a disadvantage that "the storage device does not store a stamp mark that has been processed under the same image processing condition(s) as the image processing condition(s) entered by a user," according to the image forming apparatus disclosed in Patent Document 1, it is necessary that the storage device has in advance stored as many the stamp marks as possible on the assumption that a user will enter various image processing conditions. This causes an excessive consumption of storage capacity of the storage device.

The excessive consumption of storage capacity of the storage device causes adverse effects that an access time for reading a stamp mark out becomes long and that the performance of a computer which processes the stamp mark becomes significantly deteriorated. Therefore, it is demanded, in a print control apparatus which controls print process in which the stamp mark is combined, to suppress the delay in the initiation of print process without the excessive consumption of storage capacity of the storage device.

SUMMARY OF THE INVENTION

An object of the present invention is to provide a print control apparatus enabling to suppress a delay in initiation of print process, without an excessive consumption of storage capacity of a storage device.

In order to attain the object above, a print control apparatus of the present invention, includes: a command section that causes a printing apparatus to execute a print job, in response to an input of an executive instruction of the print job, which print job causes a print subject image and a mark to be printed on a sheet in a superimposed manner; an accepting section that accepts a processing condition for an image process of the mark, during a processing condition accepting period, which is set for every print job and is the period before the input of the executive instruction; and an image processing section that performs the image process of the mark in accordance with the processing condition during the processing condition accepting period.

According to an arrangement of the present invention, the image processes of the mark are complete at the point of the entering of the execution command because the image processes of the mark are performed during the processing condition accepting period. As a result, the image processes of the mark do not have to be performed after the entering of the execution instruction. This makes it possible to prevent the delay in the initiation of printing because a time between the entering of the execution instruction and the initiation of printing can be reduced in contrast with an arrangement in which the image processes are performed on the mark after the entering of the execution instruction.

The processing condition accepting period is a period which is set for every print job. Therefore, according to the arrangement of the present invention, it is possible to surely ready the mark processed according to the processing conditions for the image processes of the mark even if the processing conditions are altered among the print jobs. Accordingly, the present invention has an effect of preventing, without the excessive consumption of storage of the storage device, the delay in the initiation of printing because it is not required to preliminarily store in the storage device as many the stamp marks as possible in consideration of various expected values of the image processing conditions, in contrast with Patent Document 1.

Additional objects, features, and strengths of the present invention will be made clear by the description below. Further, the advantages of the present invention will be evident from the following explanation in reference to the drawings.

BRIEF DESCRIPTION OF THE DRAWINGS

FIG. 3 (b) is a view illustrating a state in which a stamp mark selected in the GUI for stamp selection of FIG. 3 (a) is loaded on a memory.

FIG. 4 (b) is a view illustrating a state in which the stamp mark is loaded on the memory after performing on the stamp mark scale process according to a scaling factor shown in the GUI for scaling of FIG. 4 (a).

FIG. 5 (b) is a view illustrating a state in which the stamp mark is loaded on the memory after performing on the stamp mark rotation process according to a rotation angle shown in the GUI for rotation of FIG. 5 (a).

FIG. 6 (b) is a view illustrating a state in which the stamp mark is loaded on the memory after performing on the stamp mark trimming process according to values specifying an area to be trimmed shown in the GUI for trimming of FIG. 6 (a).

FIG. 13 (b) is a schematic view illustrating the memory after performing the scale process and the rotation process.

DETAILED DESCRIPTION OF THE INVENTION

Embodiment 1

Figure 1:
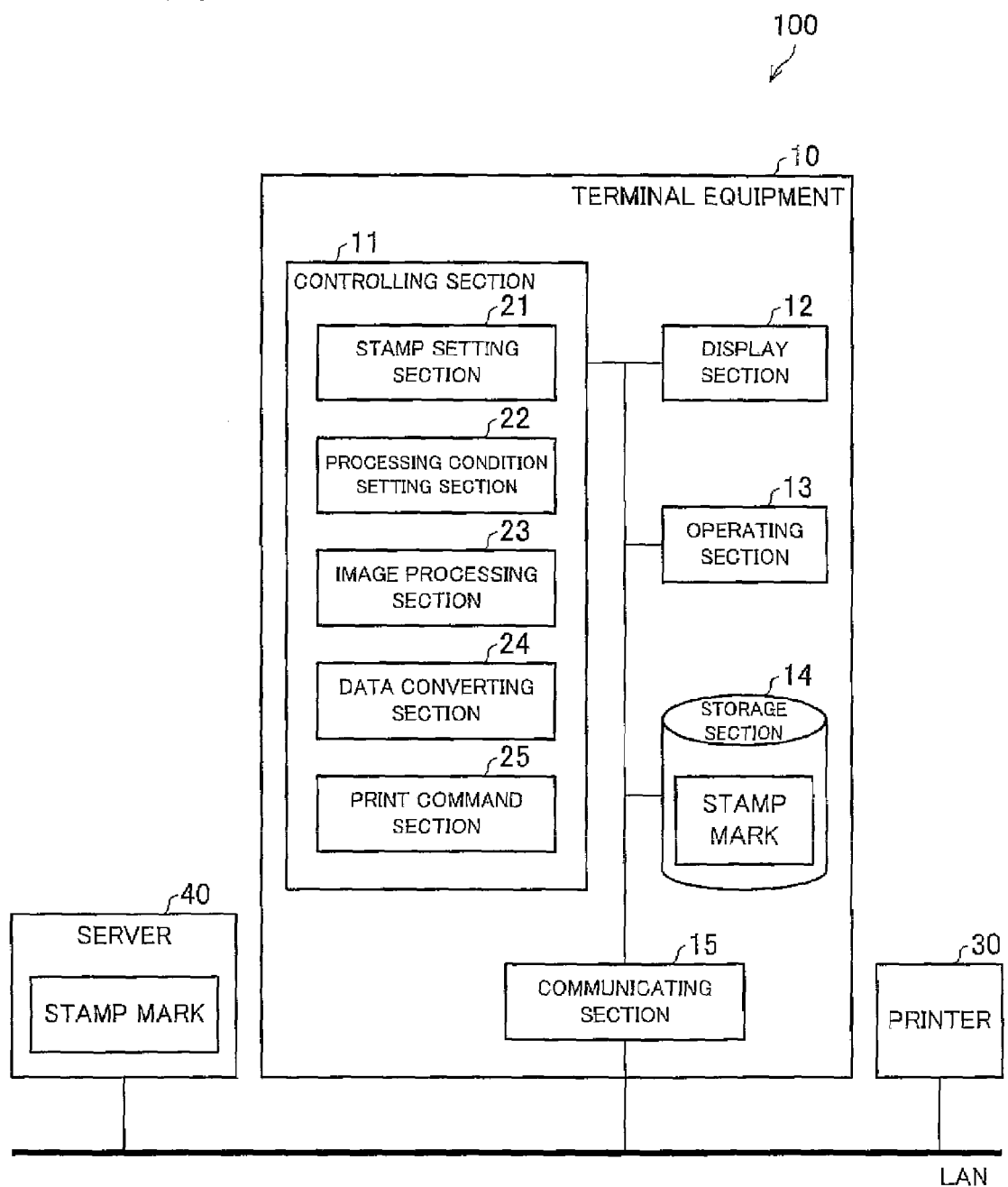
FIG. 1 is a functional block diagram illustrating a structure of a printing system in accordance with one embodiment of the present invention.

One embodiment of the present invention is described below with reference to figures. FIG. 1 is a block diagram illustrating a schematic arrangement of a printing system of the present embodiment.

As illustrated in FIG. 1, a printing system 100 includes a terminal equipment 10, a printer 30, and a server 40. The terminal equipment 10, the printer 30, and the server 40 are connected to each other via a LAN (Local Area Network).

The terminal equipment 10 is a user terminal for a user of the printing system 100. The terminal equipment 10 is a personal computer in which applications such as word-processing software, spreadsheet software, drawing software, and image editing software, a printer driver for remotely controlling the printer 30, and an OS (Operating System) are installed. More specifically, the terminal equipment 10 functions as a print control apparatus for generating, through operations of a user, print data and sending the print data to the printer 30, thereby making the printer 30 execute a print job.

The print data here indicates data including (i) image data indicative of print subject images such as documents, photographs, pictures, and/or diagrams prepared by the applications and (ii) various commands for causing the printer 30 to print the print subject images indicated by the image data.

The printer 30 is a printer apparatus which prints on a sheet an image indicated by image data which is contained in print data, when the print data is received from the terminal equipment 10. The printer 30 may be an electrophotographic printer or an ink-jet printer.

The server 40 has a function as a control server performing overall control on the printing system 100. Besides, in this embodiment, the server 40 plays the role of storing means for storing various data and various programs which are handled by the terminal equipment 10 and the printer 30.

The following describes a detailed arrangement of the terminal equipment 10.

As illustrated in FIG. 1, the terminal equipment 10 includes a controlling section 11, a display section 12, an operating section 13, a storage section 14, and a communicating section 15.

The controlling section 11 is a block for controlling the process which is performed by the printer driver. That is, the controlling section 11 is a block which is booted in response to a call instruction for the printer driver. The controlling section 11 prepares the print data in accordance with various commands entered by a user and sends the print data to the printer 30, thereby making the printer 30 execute the print job. An arrangement of the controlling section 11 is later described in detail.

The display section 12 is an image display device for displaying GUIs (Graphical User Interfaces) of the applications, the printer driver, and the OS. The image display device is a device such as a liquid crystal display device, a plasma display, or a CRT (Cathode Ray Tube). The operating section 13 has a function as input means for a user to enter various commands and various kinds of data into the controlling section 11. The operating section 13 is a device such as a keyboard or a pointing device. The storage section 14 is a storage device for storing various kinds of information handled by the controlling section 11. The storage section 14 is composed of a hard disk or a ROM (Read Only Memory), for example. The communicating section 15 is a block which is a communications interface for various data communications between the terminal equipment 10 and the printer 30 or the server 40, via the LAN.

The terminal equipment 10 of the present embodiment normally makes the printer 30 execute a print job to print on a sheet the print subject image. In a case where the terminal equipment 10 accepts a stamp setting command from a user, the terminal equipment 10 causes the printer 30 to execute a print job to print on a sheet the print subject image, with the stamp mark overlaying (superimposing) the sheet.

The stamp mark here indicates an image indicative of a mark printed over the print subject image. Such an image is a bitmap image indicative of letters, pictures, patterns, etc. For example, the stamp mark is exemplified by an image indicative of a mark such as "FOR INTERNAL USE ONLY", or "TOP SECRET." The stamp mark is sometimes referred to as watermark.

The print subject image (hereafter merely referred to as "image") is an image which is prepared in order to be printed on a sheet. That is, the image indicates an image such as an image prepared with the various applications such as word-processing software and/or drawing software, an image captured with a digital camera, or an image scanned by a scanner.

The following describes a detailed arrangement of the controlling section 11. As illustrated in FIG. 1, the controlling section 11 includes a stamp setting section 21, a processing condition setting section 22, an image processing section 23, a data converting section 24, and a print command section 25.

The stamp setting section 21 is a block for performing, in response to the stamp setting command to the controlling section 11, the process causing a user to set a stamp mark to be used in printing. The following description deals with in detail the process the stamp setting section 21 performs.

In response to the stamp setting command, the stamp setting section 21 displays on the display section 12 a GUI 50 for mode selection (see FIG. 2), the GUI 50 prompting a user to select either a stamp entering mode or a stamp selection mode. In the GUI 50 shown in FIG. 2, the user selects a desired mode using the operating section 13 by clicking a radio button provided beside the place where the desired mode is displayed and then by clicking a "Next" button.

When the "stamp entering mode" is selected, the stamp setting section 21 displays an the display section 12 a GUI 60 (see FIG. 7) for stamp entering. By operating the operating section 13, the user can type a desired stamp mark (character string) in a text box 61 which is displayed by the GUI 60 for stamp entering.

Figure 3A:
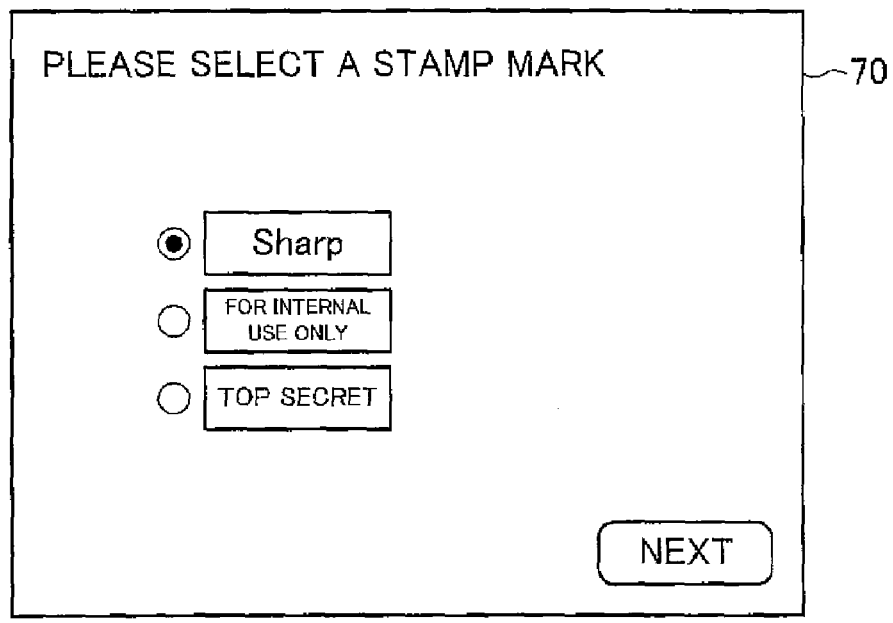
FIG. 3 (a) is a view illustrating a GUI for stamp selection to be displayed by the display section of the terminal equipment of FIG. 1.
Figure 3B:
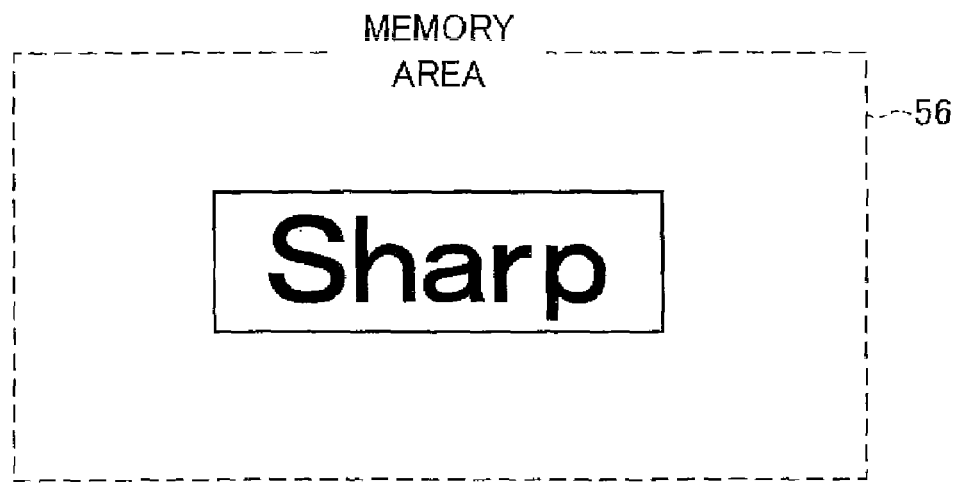

Instead, when the "stamp selection mode" is selected, the stamp setting section 21 reads out a plurality of stamp marks stored in the server 40 and displays on the display section 12 a GUI 70 for stamp selection (see FIG. 3 (a)), the GUI 70 showing the plurality of stamp marks. In the GUI 70 for stamp selection, the user can select a desired stamp mark using the operating section 13 by clicking a radio button provided beside the place where the desired stamp mark is displayed. In the GUI 70 for stamp selection of FIG. 3 (a), three stamp marks stored in the server 40 are displayed: "Sharp," "FOR INTERNAL USE ONLY," and "TOP SECRET."

When a user enters or selects a stamp mark, the stamp setting section 21 loads the stamp mark thus entered or selected into a memory 56 of the terminal equipment 10 (Strictly, bitmap data of the stamp mark is loaded into the memory 56). FIGS. 3 (a) and (b) show that a stamp mark "Sharp" is being currently selected by a user and the currently selected stamp mark "Sharp" has been loaded on the memory area (memory) 56 of the terminal equipment 10.

The processing condition setting section 22 is a block for prompting a user to enter processing condition(s) for image process(es) which is performed with respect to a stamp mark entered or selected after the stamp mark is entered or selected, respectively, by the user. Specifically, by displaying GUIs as illustrated in FIG. 4 (a), FIG. 5 (a) or FIG. 6 (a) on the display section 12, the processing condition setting section 22 prompts the user to enter the processing condition(s) for the image process(es).

The image process indicates a process such as a scale process for scaling a stamp mark, a rotation process for rotating the stamp mark, and/or a trimming process for trimming a part of the stamp mark. The processing condition(s) indicates a scaling factor for the scale process, a rotation angle for the rotation process, and/or information specifying an area to be trimmed in the trimming process.

Figure 4A:
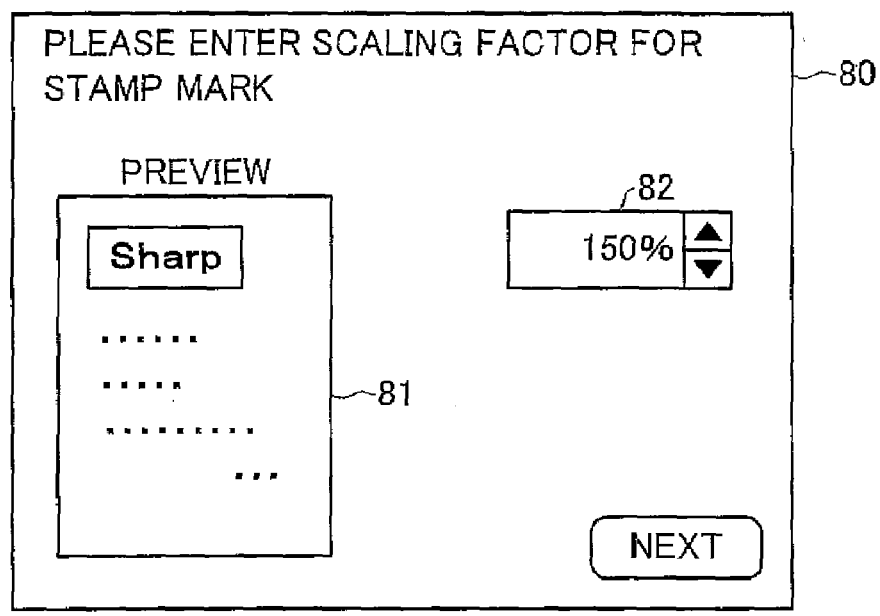
FIG. 4 (a) is a view illustrating a GUI for scaling to be displayed by the display section of the terminal equipment of FIG. 1.
Figure 4B:
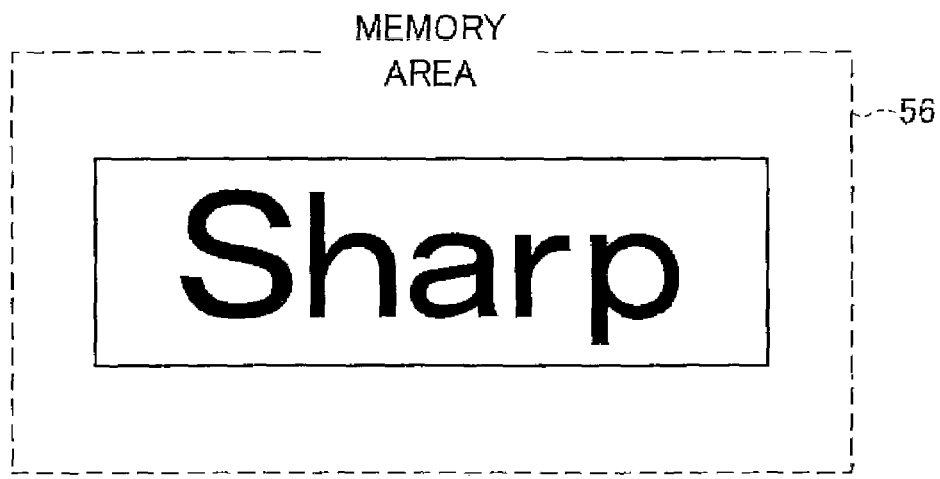

FIG. 4 (a) illustrates a GUT 80 for scale process which is used for entering the scaling factor for the scale process of the stamp mark. In the GUI 80 for scale process, a print preview 81 and a numeric entering box 82 are displayed. According to the print preview 81, an image and the stamp mark are combined with each other. By operating the operating section 13, the user can enter in the numeric entering box 82 a scaling factor for the scale process.

Figure 5A:
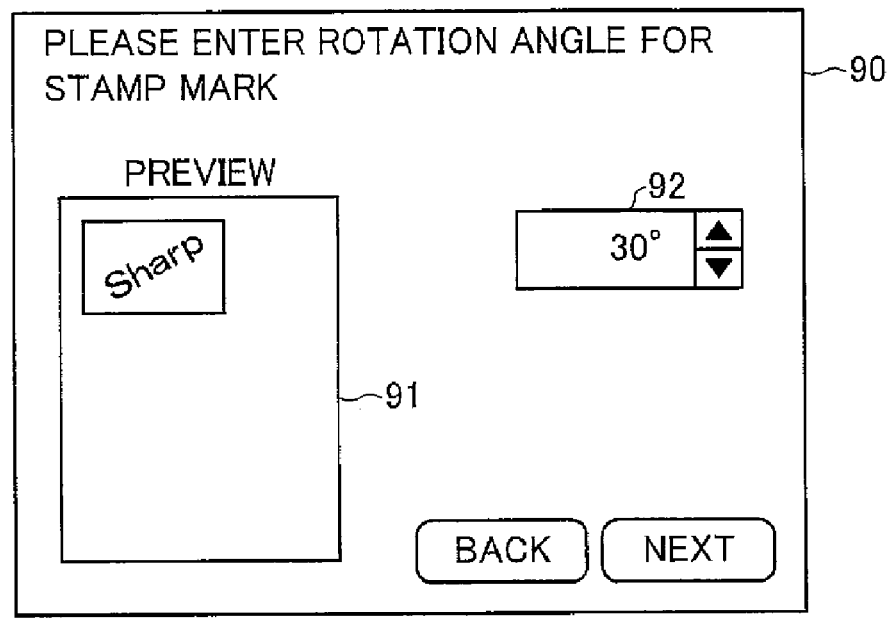
FIG. 5 (a) is a view illustrating a GUI for rotation to be displayed by the display section of the terminal equipment of FIG. 1.
Figure 5B:
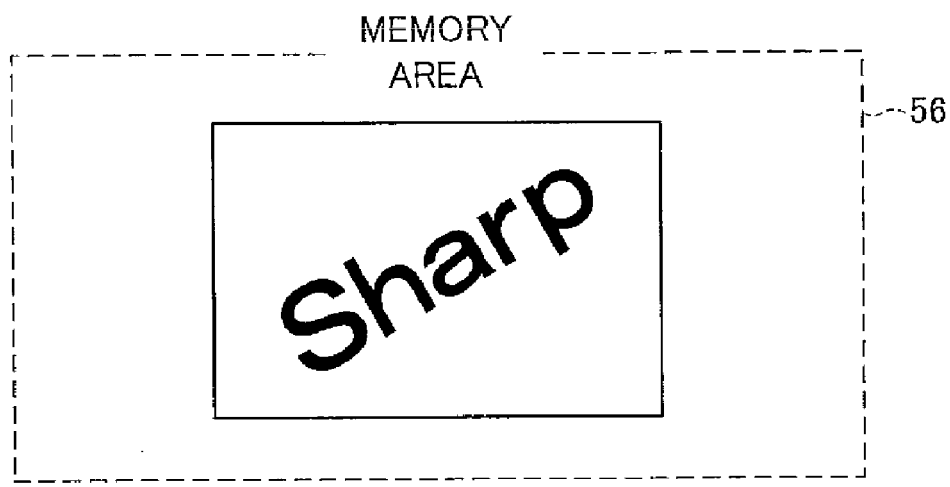

FIG. 5 (a) illustrates a GUI 90 for rotation process which is used for entering a rotation angle for the rotation process of the stamp mark. The GUI 90 for rotation process shows a print preview 91 and a numeric entering box 92. According to the print preview 91, an image and the stamp mark are combined with each other. By operating the operating section 13, the user can enter in the numeric entering box 92 a rotation angle for the rotation process.

Figure 6A:
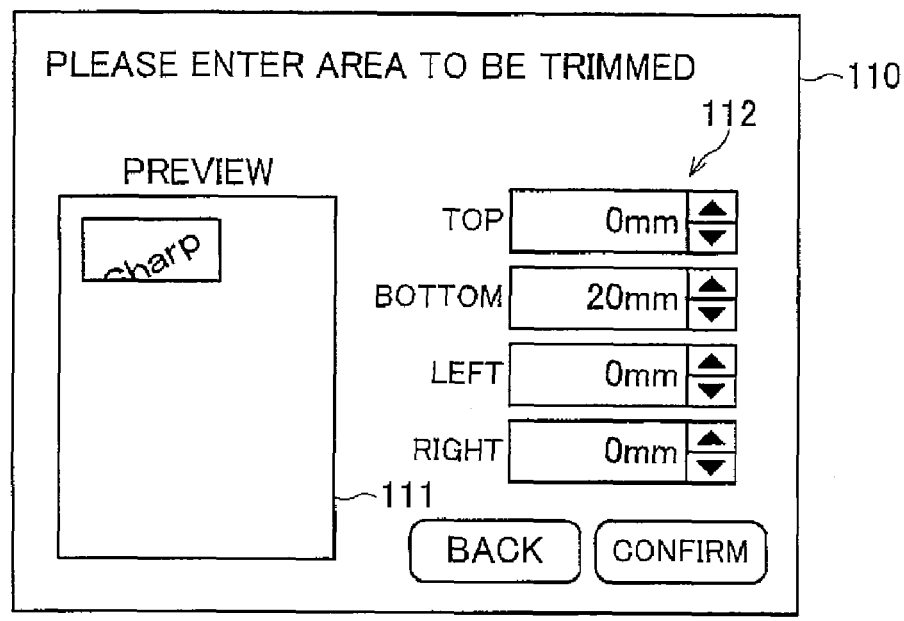
FIG. 6 (a) is a view illustrating a GUI for trimming to be displayed by the display section of the terminal equipment of FIG. 1.
Figure 6B:
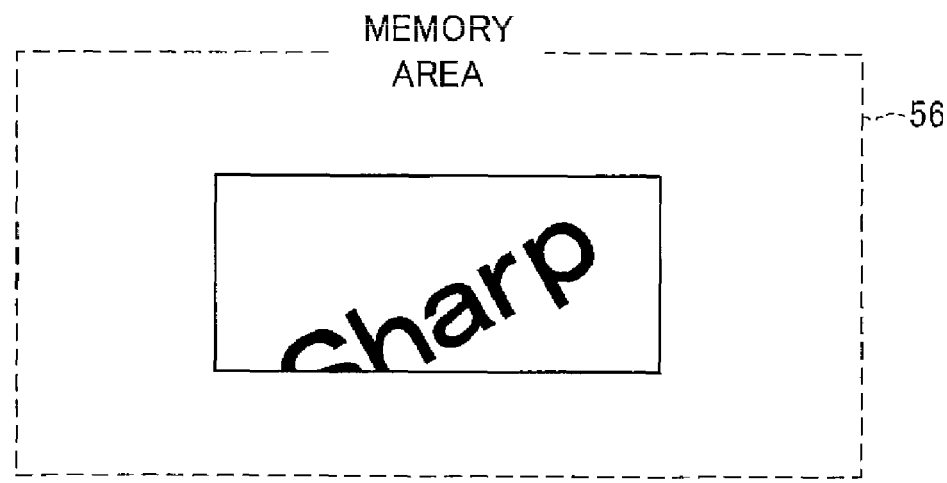

FIG. 6 (a) illustrates a GUI 110 for trimming process which is used for entering the information specifying an area to be trimmed in the trimming process of the stamp mark. In the GUI 110 for trimming process, a print preview 111 and a numeric entering box 112 are displayed. According to the print preview 111, an image and the stamp mark are combined with each other. By operating the operating section 13, the user can enter in the numeric entering box 112 the information (values) specifying an area to be trimmed in the trimming process.

The image processing section 23 is a block for performing image processes with respect to a stamp mark in accordance with entered processing condition(s) when the processing condition(s) is(are) entered for the image process with respect to the stamp mark, which stamp mark is entered or selected by a user. When a processing condition for an image process is entered, the image processing section 23 carries out upon the entering of the processing condition the image process with respect to the stamp mark loaded on the memory area 56 in accordance with the processing condition.

For example, assume that the GUI 80 for scale process is displayed as shown in FIG. 4 (a) and the scaling factor in the numeric entering box 82 is 100%. When a user carries out the entering process so that the scaling factor of 100% shown in the numeric entering box 82 is changed to 150% by user's operation via the operating section 13, both (i) the stamp mark loaded on the memory area 56 and (ii) the stamp mark displayed in the print preview 81 are scaled up 1.5 times at almost the same timing as the entering process.

Similarly, assume that the GUI 90 for rotation process is displayed as shown in FIG. 5 (a) and the rotation angle in the numeric entering box 92 is 0°. When a user carries out an entering process so that the rotation angle of 0° displayed in the numeric entering box 92 is changed to 30° by user's operation via the operating section 13, both (i) the stamp mark loaded on the memory area 56 and (ii) the stamp mark displayed in the print preview 91 are rotated by 30° at almost the same timing as the entering process.

The data converting section 24 is a block which receives image data prepared with various applications such as word-processing software from the application when a print command (print instruction) is entered by the user, converts the image data into image data which is interpretable for the printer 30, and sends to the print command section 25 image data thus converted.

The print command section 25 is a block which prepares print data when the image data is received from the data converting section 24, and then sends print data thus prepared to the printer 30, thereby making the printer 30 execute a print job.

The print data here is data including (i) image data indicative of a print subject image, which image data is received from the data converting section 24, (ii) a stamp mark which has been subjected to the image processes of the image processing section 23, and (iii) a command causing the print subject image to be printed on a sheet, with the stamp mark overlaying the sheet. Namely, the printer 30 which received the print data combines the print subject image and the stamp mark, and prints on a sheet a composite image thus combined.

Figure 8:
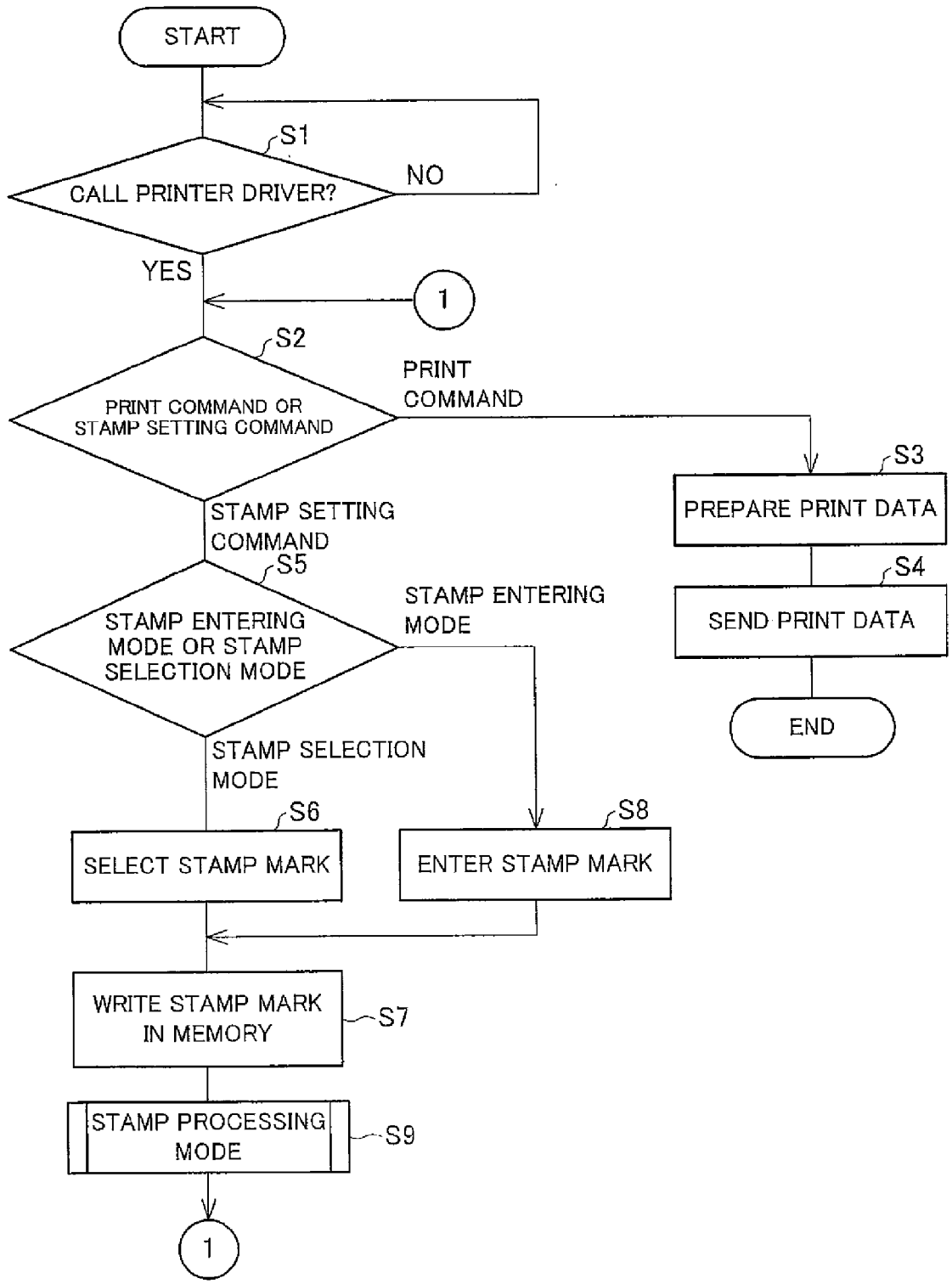
FIG. 8 is a flowchart illustrating a process flow of a control section of the terminal equipment of FIG. 1.

A processing flow of the controlling section 11 is described below with reference to a flowchart of FIG. 8. When a call instruction for the printer driver is entered (YES at S1) by a user via the operating section 13 while an application carries out a process in the terminal equipment 10, the controlling section 11 is booted and enters into a standby status (S2) waiting for a print command or a stamp setting command to be entered.

A user can set job conditions for the print job by operating the operating section 13 during the standby status at S2. The job conditions are set for every print job. Examples of the job conditions include a condition relating to the number of print copies, a condition relating to print page, a condition relating to print direction (vertical binding or horizontal binding), a condition relating to print side (single-sided printing or double-sided printing), a condition relating to paper size, and a condition relating to toner density.

When a user enters not a stamp setting command but a print command to the terminal equipment 10 at S2 (S2→S3), the data converting section 24 converts the image data prepared by the application into the image data which is interpretable for the printer 30. Thereafter, the print command section 25 prepares print data (S3) including (i) image data converted by the data converting section 24, (ii) information on job conditions which were set by a user, and (iii) a command causing an image indicated by the image data to be printed. Then, the print command section 25 sends the print data thus prepared to the printer 30 (S4). Thus, the printer 30 prints the image prepared by the application on a sheet without overlaying the stamp mark on the image.

Figure 2:
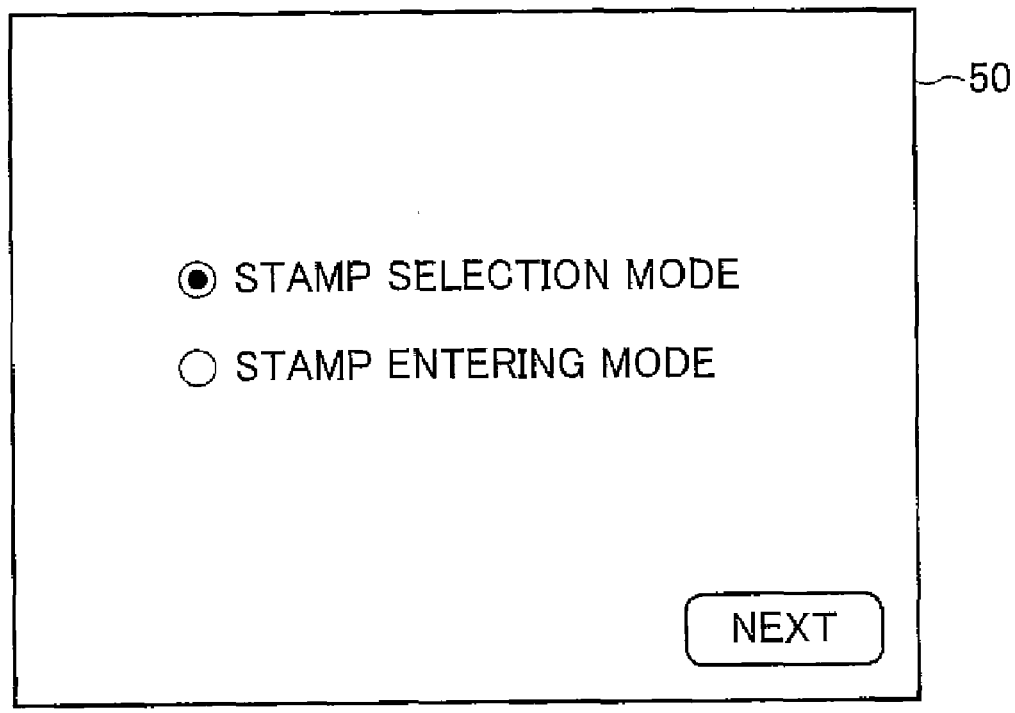
FIG. 2 is a view illustrating a GUI for mode selection to be displayed by a display section of a terminal equipment of FIG. 1.

When the user enters not a print command but a stamp setting command at S2 (S2→S5), the stamp setting section 21 displays the GUI for mode selection as illustrated in FIG. 2, and prompts the user to select either a "stamp entering mode" or a "stamp selection mode" (S5).

When the user selects a "stamp selection mode" at S5, the stamp setting section 21 (i) reads out the plurality of stamp marks stored in the server 40, (ii) displays the GUI 70 for stamp selection as illustrated in FIG. 3 (*a*) which shows the plurality of stamp marks on the display section 12, and (iii) prompts the user to select a desired stamp mark from the plurality of stamp marks shown in the GUI 70 for stamp selection (S6). When the user selects a "stamp entering mode" at S5, the stamp setting section 21 displays the GUI 60 for stamp entering as illustrated in FIG. 7 and prompts the user to enter a desired stamp mark (S8).

After the user selects a desired stamp mark at S6 or enters a desired stamp mark at S8, the stamp setting section 21 loads the selected stamp mark or the entered stamp mark into the memory area 56 of the terminal equipment 10 (S7) as illustrated in FIGS. 3(*a*) and 3(*b*).

Figure 7:
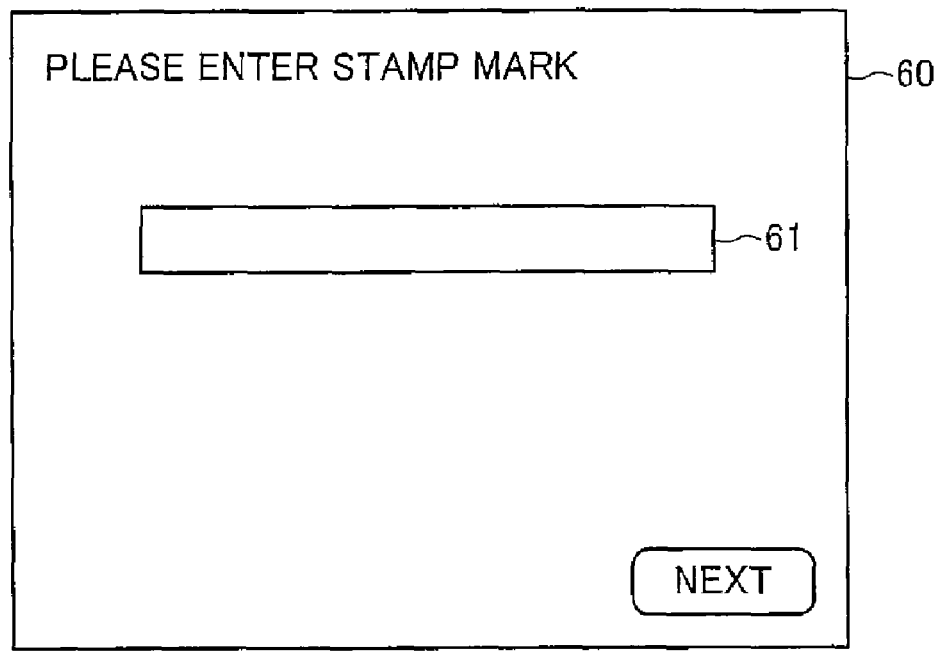
FIG. 7 is a view illustrating a GUI for stamp entering to be displayed by the display section of the terminal equipment of FIG. 1.

When the user clicks on a "Next" button in the GUI 70 for stamp selection illustrated in FIG. 3 (*a*) or in the GUI 60 for stamp entering illustrated in FIG. 7, the controlling section 11 proceeds to a stamp processing mode at S9.

The stamp processing mode (processing condition accepting period) is a period, which is set for every print job and is set before a print command is entered. In this period, processing conditions entered by a user for the stamp mark are accepted.

Figure 9:
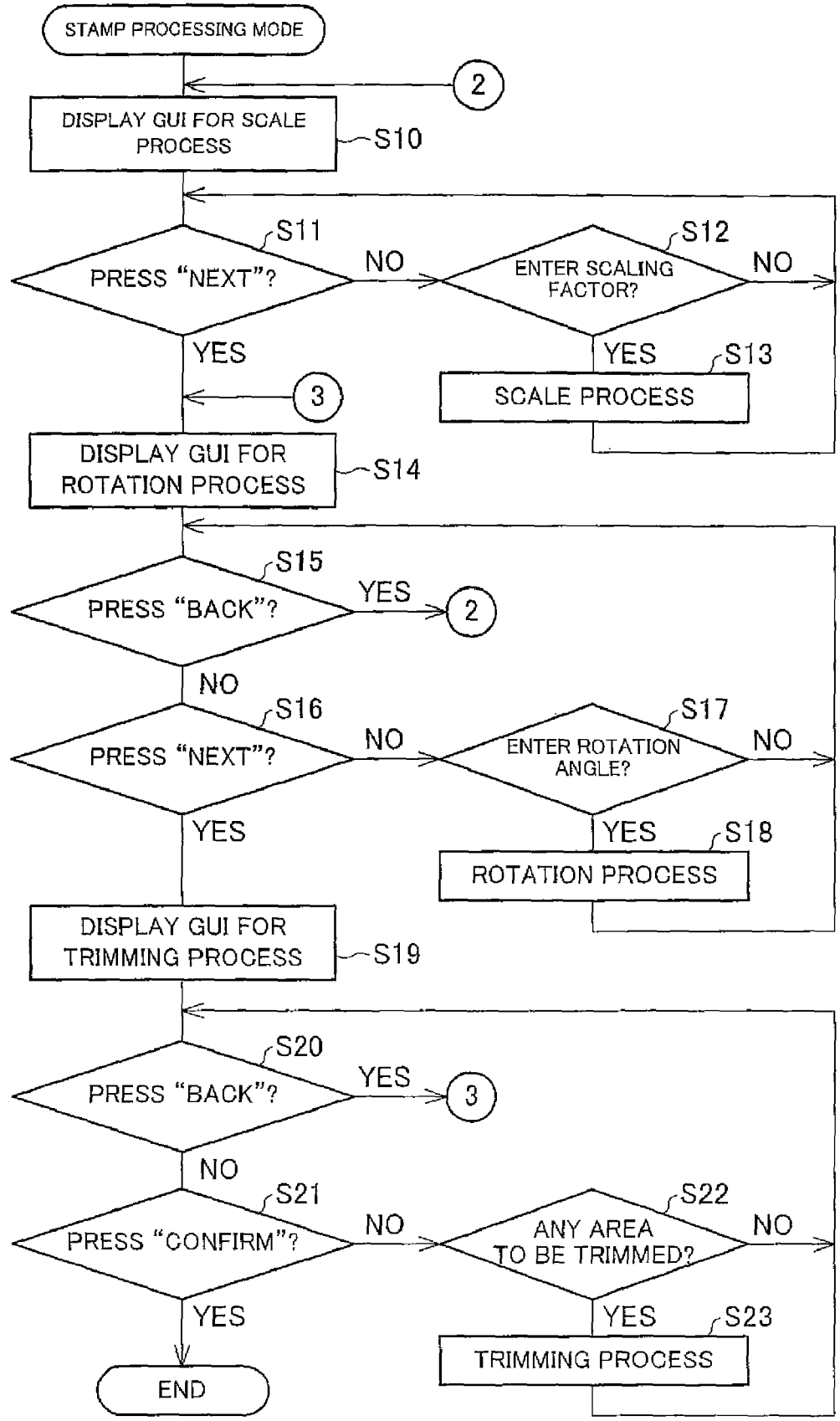
FIG. 9 is a flowchart illustrating a subroutine of an S9 of FIG. 8.

The stamp processing mode at S9 is described below in details. FIG. 9 is a flowchart of a subroutine of S9 in FIG. 8.

After the controlling section 11 proceeds to the stamp processing mode, the processing condition setting section 22 displays on the display section 12 the GUI 80 for scale process as shown in FIG. 4 (*a*) (S100). When a user enters a scaling factor for the scale process into the numeric entering box 82 of the GUI 80 for scale process (NO at S11, YES at S12), the image processing section 23 carries out upon the entering of the scale factor the scale process in accordance with the scaling factor with respect to stamp mark loaded on the memory area 56 (S13).

That is, as illustrated in FIGS. 4 (*a*) and (*b*), the image processing section 23 (i) performs upon the entering of the scaling factor for the scale process the scale process with respect to the stamp mark loaded on the memory area 56, (ii) overwrites an area where a first stamp mark that has not been subjected to the scale process was written with a second stamp mark that has been subjected to a scale process, and (iii) changes the size of a stamp mark displayed in the preview. In substantially sync with entering of 150% in the numeric entering box 82 as illustrated in FIG. 4 (*a*), for example, a size of the stamp mark loaded on the memory area 56 is scaled up 1.5 times as large as the original stamp mark. Similarly, in substantially sync with entering of 80% in the numeric entering box 82 of FIG. 4 (*a*), a size of the stamp mark loaded on the memory area 56 is scaled down 0.8 times as large as the original stamp mark.

The original stamp mark indicates a stamp mark which is stored in the server 40 and which has not been subjected to the image processes of the image processing section 23.

In a case where a "Next" button of the GUI 80 for scale process is clicked (YES at S11) while the GUI 80 for scale process is displayed on the display section 12, the processing condition setting section 22 stops displaying the GUI 80 for scale process and displays on the display section 12 the GUI 90 for rotation process as illustrated in FIG. 5 (*a*) (see S14). Note that S14 is proceeded, regardless of whether or not a scaling factor for the scale process is entered.

When a user enters a rotation angle for the rotation process into the numeric entering box 92 of the GUI 90 for rotation process (NO at S15 and S16, YES at S17) while the GUI 90 for rotation process is displayed on the display section 12, the image processing section 23 carries out upon the entering of the rotation angle the rotation process in accordance with the rotation angle with respect to a stamp mark loaded on the memory area 56 (S18).

That is, as illustrated in FIGS. 5 (*a*) and (*b*), the image processing section 23 (i) performs upon the entering of the rotation angle for the rotation process the rotation process with respect to the stamp mark loaded on the memory area 56, (ii) overwrites an area where a first stamp mark that has not been subjected to the rotation process was written with a second stamp mark that has been subjected to the rotation process, and (iii) also performs the rotation process with respect to a stamp mark displayed in the preview. In substantially sync with entering of 30° in the numeric entering box 92 as illustrated in FIG. 5 (*a*), for example, the stamp mark loaded on the memory area 56 tilts 30° in contrast with the original stamp mark. Similarly, in substantially sync with entering of 60° in the numeric entering box 92 of FIG. 5 (*a*), the stamp mark loaded on the memory area 56 tilts 60° in contrast with the original stamp mark.

In a case where rotation process is performed at S18 without performing the scale process at S13, the stamp mark, which was loaded on the memory area 56 just before S18 is proceeded, is the original stamp mark. Therefore, the rotation process is performed at S18 with respect to the original stamp mark.

On the other hand, in a case where the rotation process is performed at S18 after performing the scale process at S13, the stamp mark, which is loaded on the memory area 56 just before S18 is proceeded, is the stamp mark that has been subjected to the scale process. Therefore, the rotation process is performed at S18 with respect to the stamp mark that has been subjected to the scale process. As a result, the stamp mark, which is loaded on the memory area 56 after S18, is the stamp mark that has been subjected to both the scale process and the rotation process.

In a case where a "Back" button of the GUI 90 for rotation process is clicked (YES at S15) while the GUI 90 for rotation process is displayed on the display section 12, the processing condition setting section 22 stops displaying the GUI 90 for rotation process, goes back to S10, and displays on the display section 12 the GUI 80 for scale process as illustrated in FIG. 4 (*a*). Note that S15 is proceeded, regardless of whether or not a rotation angle for the rotation process is entered.

In a case where the "Back" button of the GUI 90 for rotation process illustrated in FIG. 5 (*a*) is clicked after the rotation process at S18 (S18→YES at S15→S10), the scale process can be performed with respect to the stamp mark which has been subjected to the rotation process because the memory area 56 has been overwritten with a stamp mark which has been subjected to the rotation process.

In a case where a "Next" button of the GUI 90 for rotation process is clicked (YES at S16) while the GUI 90 for rotation process illustrated in FIG. 5(*a*) is displayed on the display section 12, the processing condition setting section 22 stops displaying the GUI 90 for rotation process and displays on the display section 12 the GUI 110 for trimming process illustrated in FIG. 6 (*a*). Note that S16 is proceeded, regardless of whether or not a rotation angle for the rotation process is entered.

When a user enters values specifying an area to be trimmed in the numeric entering box 112 of the GUI 110 for trimming process (NO at S20 and S21, YES at S22) while the GUI 110 for trimming process illustrated in FIG. 6(*a*) is displayed on the display section 12, the image processing section 23 carries out upon the entering of the values the trimming process in accordance with values thus inputted with respect to a stamp mark (S23).

That is, as illustrated in FIGS. 6 (*a*) and (*b*), the image processing section 23 (i) performs upon the entering of the values specifying an area to be trimmed the trimming process with respect to the stamp mark loaded on the memory area 56, (ii) overwrites an area where a first stamp mark that has not been subjected to the trimming process was written with a second stamp mark that has been subjected to the trimming process, and (iii) also performs the trimming process with respect to a stamp mark displayed in the preview.

In a case where the trimming process is performed at S23 without performing the rotation process at S18, the stamp mark, which was loaded on the memory area 56 just before S23 is proceeded, is a stamp mark which has not been subjected to the rotation process. Therefore, the trimming process is performed at S23 with respect to the stamp mark which has not been subjected to the rotation process.

On the other hand, in a case where the trimming process is performed at S23 after performing the rotation process at S18, the stamp mark, which was loaded on the memory area 56 just before S23 is proceeded, is a stamp mark which has been subjected to the rotation process. Therefore, the trimming process is performed at S23 with respect to the stamp mark which has been subjected to the rotation process. As illustrated in FIG. 6(*b*), the stamp mark loaded on the memory area 56 after S23 is a stamp mark which has been subjected to both the rotation process and the trimming process.

In a case where a "Back" button of the GUI 110 for trimming process is clicked (YES at S20) while the GUI 110 for trimming process is displayed on the display section 12, the processing condition setting section 22 stops displaying the GUI 110 for trimming process, goes back to S14, and displays on the display section 12 the GUI 90 for rotation process illustrated in FIG. 5 (*a*). Note that S20 is proceeded, regardless of whether or not the trimming process has been performed.

In a case where the "Back" button of the GUI 110 for trimming process illustrated in FIG. 6 (*a*) is clicked after the trimming process at S23 (S23→YES at S20→S14), the rotation process can be performed with respect to the stamp mark which has been subjected to the trimming process because the memory area 56 has been overwritten with the stamp mark which has been subjected to the trimming process.

In a case where a "Confirm" button of the GUI 110 for trimming process illustrated in FIG. 6(*a*) is clicked (YES at S21) while the GUI 110 for trimming process is displayed on the display section 12, the processing condition setting section 22 stops displaying the GUI 110 for trimming process. The controlling section 11 exits the stamp processing mode and proceeds to S2 of FIG. 8.

When a print command is entered into the terminal equipment 10 (S2→S3) after thus performing the stamp processing mode, the data converting section 24 converts image data prepared with an application into image data which is interpretable for the printer 30. The print command section 25 prepares print data (S3) containing image data thus converted by the data converting section 24, the stamp mark processed in the stamp processing mode, print settings set by the user, and a command to print on a sheet an image indicated by the image data, with the stamp mark overlaying the sheet. The print command section 25 then sends prepared print data to the printer 30 (S4). Thus, the printer 30 can print on a sheet the image prepared with the application, with the stamp mark overlaying the sheet.

The terminal equipment (print control apparatus) 10 includes (i) a print command section (command section) 25 for causing the printer (printing apparatus) 30 to execute a print job in which a print subject image is printed on a sheet, with a stamp mark overlaying the sheet (combined with each other), when a user enters a print command (executive instruction), (ii) a processing condition setting section (accepting section) 22 for accepting the processing conditions, entered by a user, for image processes of the stamp mark during a processing condition accepting period (stamp processing mode, S9) which comes before the print command is entered and is set for every print job, and (iii) an image processing section (image processing section) 23 for performing image processes with respect to the stamp mark in accordance with the processing conditions during the processing condition accepting period.

According to the arrangement, the image processes of the stamp mark are carried out within a processing condition accepting period. This results in that the image processes of the stamp mark have already been completed at the point of the entering of the print command. This eliminates the necessity for carrying out the image processes with respect to the stamp mark after the print command is entered. This makes it possible to prevent delay in the initiation of printing because it is possible to reduce the time required from the entering of the print command to the initiation of printing, as compared with an arrangement in which the image process is performed with respect to a stamp mark after the print command is entered. This allows suppression of delay in the initiation of print process. Note that the processing condition accepting period indicates a period, which is set for every print job. Therefore, according to the arrangement of the present embodiment, even if processing conditions for a stamp mark differ from print job to print job, it is always possible to prepare a stamp mark that has been processed under the processing conditions. Thus, the arrangement of the present embodiment gives rise to an effect of suppressing a delay in the initiation of print process, without excessive consumption of memory storage of a storage device. This is because it is not necessary to store, in advance, in the storage device as many stamp marks as possible on the assumption that various processing conditions are to be entered by a user. This is unlike Patent Document 1.

In the printing system 100 illustrated in FIG. 1, original stamp marks are stored in the server 40. However, the present embodiment is not limited to this. Alternatively, the storage section 14 of the terminal equipment 10 may also store original stamp marks. This makes it possible, for example, to store in the storage section 14 of the terminal equipment 10 stamp marks peculiar to users of the terminal equipment 10, whereas to store in the server 40 stamp marks commonly used among members of a department who use the printing system 100.

In the printing system 100 illustrated in FIG. 1, the image data indicating the print subject image and the stamp mark are combined in the printer 30. However, the present embodiment is not limited to this. Alternatively, the image data and the stamp mark may be combined in the data converting section 24 of the terminal equipment 10 and the data thus combined may be put in the print data so that this print data is sent to the printer 30. That is, the combination of the data of the print subject image and the stamp mark may be performed either in the printer 30 or in the terminal equipment 10.

The controlling section 11 of the terminal equipment 10 may have a function as a display controlling section. In such a display controlling section, the display section 12 is controlled so as to (i) display, before performing image process "a", a pre-processing mark and a first identifying information indicative of the pre-processing mark, (ii) display, after performing the image process 'a,' a post-processing mark and a second identifying information indicative of the post-processing mark, where the pre-processing mark indicates a stamp mark that has not been subjected to the image process "a" and the post-processing mark indicates a stamp mark that has been subjected to the image process "a", (iii) display the pre-processing mark when a user enters the first identifying information, and (iv) display the post-processing mark when the user enters the second identifying information. The following description deals with an example of this arrangement.

Assume, for example, the following arrangement: (i) when a stamp mark "a" is prepared by performing scale process at a scaling factor of 90% with respect to an original stamp mark, the controlling section 11 controls the display section 12 to display a video image "a" indicative of a stamp mark "a" and a symbol "a" identifying the stamp mark "a", (ii) when a stamp mark "b" is prepared by performing the scale process at a scaling factor of 120% with respect to the stamp mark "a", the controlling section 11 controls the display section 12 so as to display a video image "b" indicative of the stamp mark "b" and a symbol "b" identifying the stamp mark "b", (iii) when a stamp mark "c" is prepared by performing the scale process at a scaling factor of 60% with respect to the stamp mark "b", the controlling section 11 controls the display section 12 so as to display a video image "c" indicative of the stamp mark "C" and a symbol "c" identifying the stamp mark "c", (iv) thereafter, when a user enters the symbol "b" while the video image "c" is displayed on the display section 12, the controlling section 11 controls the display section 12 so as to display the video image "b" corresponding to the symbol "b" again, whereas, when the user enters the symbol "a," the controlling section 11 controls the display section 12 so as to display the video image "a" corresponding to the symbol "a" again. By this arrangement, even if the image processes are performed, on wrong processing conditions, with respect to a stamp mark, a user can make the display section 12 redisplay immediately the stamp mark which has not been subjected to the image processes based on the wrong processing conditions.

The controlling section 11 in the terminal equipment 10 may include: a function as a format determination section that determines a format of the image based on image data indicative of the image; a function as a second storage controlling section that controls the storage section 14 to store (i) format information indicative of the format, which format is determined by the format determination section and (ii) the mark that has been subjected to the image process of the image processing section 23 so that the format information and the mark are correlated with each other; and a function as a readout section that, when the format information is entered, reads out from the storage section 14 the mark correlated with the format information, the print command section 25 causing the printer 30 to execute a print job which causes the print subject image is printed on the sheet, with a mark overlaying the sheet, the mark read out by the readout section. This arrangement gives a user the following convenience. Namely, in cases where there is a stamp mark with which a specific format such as "weekly report" is always combined, the stamp mark is read out merely by entering format information.

The format information in this arrangement is represented by, for example, "Weekly Report," "Notice of Conference," or "Report," in a case where the format of the print subject image is a weekly report, a notice of conference, or a report, respectively. Since the format information of a print subject image prepared by an application is added to image data of the print subject image in many cases, the format determination section can determine the format of the image based on the image data.

In the processing flow of FIG. 9, as for the scale process (the first process) and the rotation process (the second process), whose processing contents are different from each other, the processing condition setting section 22 is intended to accept a scaling factor for the scale process (the first condition) during a period between S10 and S13 (the first period) in which a scaling factor can be accepted, whereas to accept a rotation angle for the rotation process (the second condition) during a period between S14 and S18 (the second period) in which a rotation angle can be accepted. The image processing section 23 is intended to perform a scale process between S10 and S13 and perform a rotation process between S14 and S18. However, the present embodiment is not limited to the procedure illustrated in FIG. 9, provided that the image process is performed with respect to a stamp mark during one of the periods in which a processing condition is accepted.

Embodiment 2

According to Embodiment 1, in the scale process at S13 shown in FIG. 9, the rotation process at S18 shown in FIG. 9, and the trimming process at S23 shown in FIG. 9, an area where a stamp mark that has not been subjected to one of these processes was written is overwritten with a stamp mark that has been subjected to the one of the processes. The present invention is, however, not limited to this. Alternatively, both the stamp mark that has been subjected to and has not subjected to each of the processes may be stored in the memory area 56.

The following describes an arrangement in which, in a case of performing an image process with respect to a stamp mark, a stamp mark that has been subjected to an image process is written in the memory area 56 without deleting from the memory area 56 a stamp mark that has not been subjected to the image process.

FIG. 13 (a) is a schematic view illustrating a memory area 56 that has been subjected to a scale process. FIG. 13 (b) is a schematic view illustrating a memory area 56 that has been subjected to a scale process and a rotation process in this order.

Figure 13A:
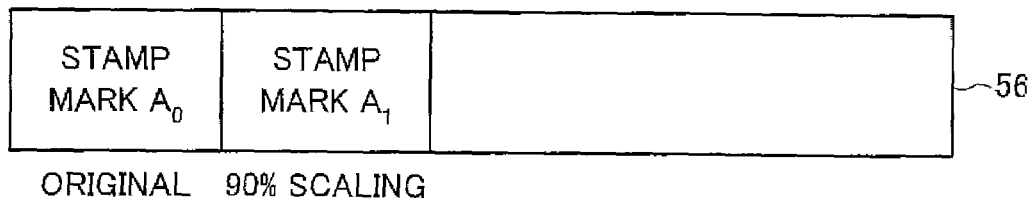
FIG. 13 (a) is a schematic view illustrating the memory after performing the scale process.

For example, when performing at S13 a scale process at a scaling factor of 90% with respect to an original stamp mark $A_0$, as illustrated in FIG. 13(a), the image processing section 23 may write, in a different area of the memory area 56 from an area where the stamp mark $A_0$ is loaded, a stamp mark $A_1$ that has been subjected to the scale process, while the original stamp mark $A_0$, which has not been subjected to the scale process, is maintained in the memory area 56 as it is (the stamp mark $A_0$ is not deleted).

In a case where a user performed at S13 by mistake the scale process at a scaling factor of 90% with respect to the original stamp mark $A_0$ but actually wishes to have the original stamp mark $A_0$, the user must go back to S12 and enter a scaling factor of 0% (S13→NO at S11: S13 and S11 are proceeded, and "NO" at S11). However, the image processing section 23 can use the stamp mark $A_0$ which is not deleted but stored in the memory area 56, without performing the scale process (process for a scaledown from 90% to 0%) with respect to the stamp mark $A_1$ to obtain the stamp mark $A_0$. This makes it possible to omit the scale process, reduce data processing time, and save resources of a computer.

Figure 13B:
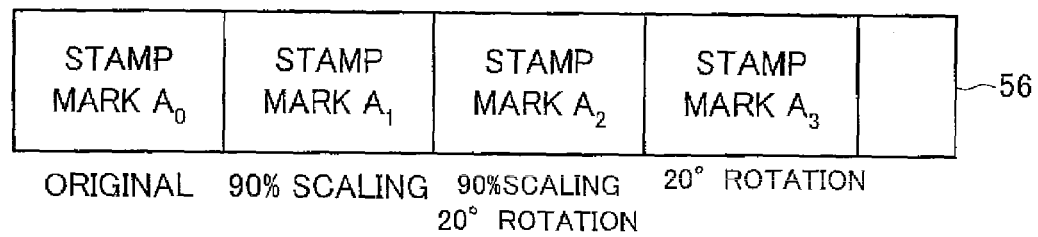

When performing an image process (scale process, rotation process, and/or trimming process) with respect to a stamp mark, the image processing section 23 may perform the image process not only with respect to a stamp mark that is to be subjected to the process but also with respect to all of stamp marks loaded on the memory area 56. Assume here as illustrated in FIG. 13(a), for example, that the stamp mark $A_0$ and the stamp mark $A_1$ which has been subjected to a scale process at a scaling factor of 90% are loaded on the memory area 56, by executing the scale process at S13. After the scale process at S13, when a rotation angle of 20° is entered at S17 for the rotation process, the image processing section 23 performs a rotation process at the rotation angle of 20° not only with respect to the stamp mark $A_1$ loaded on the memory area 56 but also with respect to the stamp mark $A_0$, although the stamp mark $A_1$ was to be subjected to the rotation process. As illustrated in FIG. 13(b), this results in that loaded on the memory area 56 are (i) the original stamp mark $A_0$ (the first mark), (ii) the stamp mark $A_1$ (the second mark) obtained by performing the scale process with respect to the stamp mark $A_0$, (iii) the stamp mark $A_2$ (the third mark) obtained by performing the rotation process with respect to the stamp mark $A_1$, and (iv) the stamp mark $A_3$ (the fourth mark) obtained by performing the rotation process with respect to the stamp mark $A_0$. In a case where a user performed at S13 the scale process at a scaling factor of 90% and at S18 the rotation process at a rotation angle of 20°, thereby obtaining the stamp mark $A_2$, but wishes to have the stamp mark $A_3$, which is obtained through the rotation process at a rotation angle of 20° without performing the scale process at a scaling factor of 90%, the user must go back to S12 and enter a scaling factor of 0% (S18→YES at S15→S10→NO at S11). However, the image processing section 23 can use the stamp mark $A_3$ stored in the memory area 56, without performing the scale process (process for a scaledown from 90% to 0%) with respect to the stamp mark $A_2$ to obtain the stamp mark $A_3$. This makes it possible to omit the scale process, reduce data processing time, and save resources of a computer.

That is, according to the example illustrated in FIG. 13 (b), the image processing section 23 has a function in which, after the first processing condition and the second processing condition from a user were accepted by the processing condition setting section (accepting section) 22, the image processing section 23 writes into the memory area 56 (i) the second mark which is obtained by performing with respect to the first mark the first image process without deleting from the memory area 56 the first mark that has not been subjected to the first image process in accordance with the first processing condition and writes into the memory area 56 without deleting from the memory area 56 the first mark and the second mark (ii) the third mark which is obtained by performing the second image process with respect to the first mark in accordance with the second processing condition and (iii) the forth mark which is obtained by performing the second image process with respect to the second mark.

Therefore, according to the example illustrated in FIG. 13(b), in the case where the first processing condition and the second processing condition from the user are accepted by the processing condition setting section 22, the image processing section 23 writes into the memory area 56 not only (i) the fourth mark that has been subjected to first and second image processes under first and second processing conditions, respectively, but also (ii) the first mark that has not been subjected to the first and second image processes, (iii) the second mark that has been subjected to the first image process but has not been subjected to the second image process, and (iv) the third mark that has been subjected to the second image process but has not been subjected to the first image process. Accordingly, for example, in a case where a user entered the first processing condition and the second processing condition but wished, in reality, to obtain either (i) the third mark that has been subjected merely to the second image process under the second processing condition, (ii) the second mark that has been subjected merely to the first image process under the first processing condition, or (iii) the first mark that has not been subjected to the first image process and the second image process, it is not necessary to prepare again the first mark, the second mark, or the third mark. This makes it possible to reduce the processing burden of a computer.

As described above, in an arrangement in which both a stamp mark that has not been subjected to an image process (scale process, rotation process, or trimming process) and a stamp mark that has been subjected to the image process are stored in the memory area 56 every time the image process is performed with respect to the stamp mark, a free area in the memory 56 decreases as the number of the image processes with respect to the stamp mark increases. Therefore, this would result in a shortage of memory storage to store the stamp marks that have been subjected to the respective image process when performing the image processes with respect to stamp marks.

This can be addressed by an arrangement in which the image processing section 23 determines, before performing an image process with respect to a stamp mark, whether or not the memory area 56 has a free area to store the stamp mark that has been subjected to the image process, and then (i) writes in the memory area 56 the stamp mark that has been subjected to the image process, if the memory area 56 has a free area, or (ii) overwrites with the stamp mark that has been subjected to the image process an area where a the stamp mark that has not been subjected to the image process, if the memory area 56 has no free area. This makes it possible to perform, without problems, image processes in accordance with the image processing conditions entered by a user, even if the free area in the memory area 56 becomes small.

Embodiment 3

Embodiments 1 and 2 above described the terminal 10 as one embodiment of the print control apparatus of the present invention. Alternatively, a multifunction printer, a copying machine, or the like, which includes a print engine and controls the print engine, can be another embodiment of the present invention. When performing copy process with the use of the print engine, it is possible to perform the stamp processing mode shown in FIG. 9 and it is possible to print on a sheet an image to be copied, with a stamp mark overlaying the sheet. In view of the circumstances, the following describes a multifunction printer as another embodiment of the print control apparatus in accordance with the present invention. For convenience, members with substantially the same functions as those of the members of Embodiment 1 are given the same symbols, and descriptions for the members are omitted.

Figure 10:
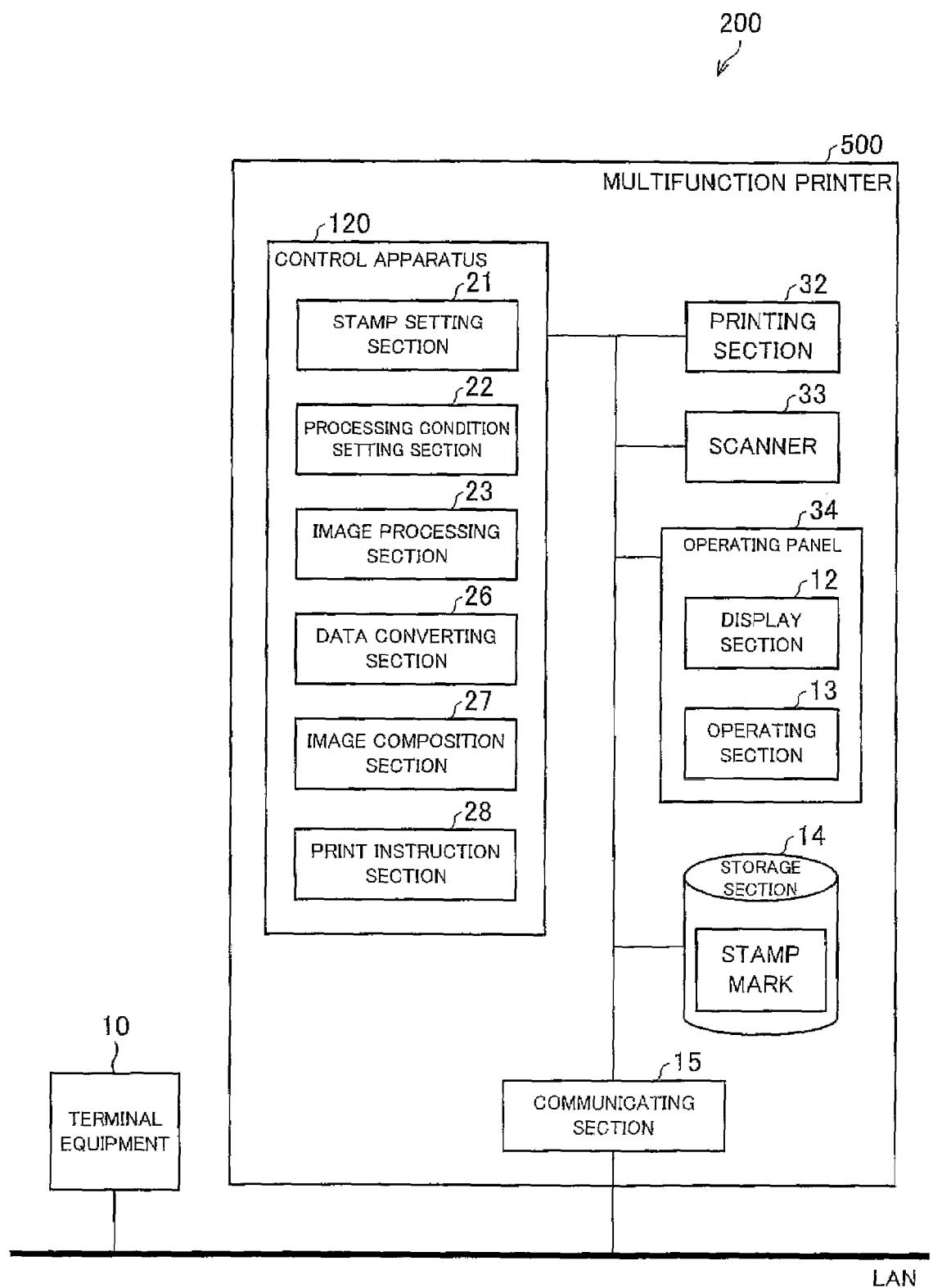
FIG. 10 is a functional block diagram illustrating a structure of a printing system of another embodiment of the present invention.

FIG. 10 is a functional block diagram illustrating a printing system 200 including a multifunction printer 500 of the present embodiment. As illustrated in FIG. 10, the multifunction printer (MFP) 500 includes a control unit 120, a printing section 32, a scanner 33, an operating panel 34, a storage section 14, and a communicating section 15.

The printing section 32 is a print engine for printing on a sheet an image based on image data contained in print data, which is transferred from the terminal 10 or the print control unit 120. The print engine may be an electrophotographic printer or an inkjet printer.

The scanner 33 is an image reading apparatus which reads an image of an original document via a line CCD (Charge Coupled Device) and generates image data indicated by the image of the original document.

When a user enters a copy command (executive instruction), the multifunction printer 500 performs copy process in which the scanner 33 scans and reads the image data from the original document and prints on a sheet the image indicated by the image data. When a stamp setting command is entered before a copy command is entered, the image indicated by image data which has been scanned by the scanner 33 is printed on a sheet, with a stamp mark overlaying the sheet, in the copy process.

The operating panel 34 has both the function of the display section 12 and the function of the operating section 13, which functions are described in Embodiment 1. Therefore, a user can enter, using the operating panel 34, various kinds of information, commands, etc. in the control apparatus 120.

The control apparatus 120 is a computer for performing overall control on each piece of hardware in the multifunction printer 500. The control apparatus 120 includes a stamp setting section 21, a processing condition setting section 22, an image processing section 23, which are described in Embodiment 1, a data converting section 26, an image composition section 27, and a print instruction section 28.

The data converting section 26 is a block in which, when the scanner 33 scans the image data from the original document in response to the user's entering of a copy command, the image data is converted into image data which is interpretable for the printing section 32, and the image data thus converted is supplied to the print instruction section 28. Note that when a stamp setting command is entered, the data converting section 26 supplies the image data thus converted to the image composition section 27.

The image composition section 27 is a block in which, when the stamp setting command is entered and the image data is scanned from the original document by the scanner 33, composite image data is generated by combining the stamp mark processed by the image processing section 23 and the image data supplied to the data converting section 26, and the composite data thus generated is supplied to the print instruction section 28.

The print instruction section 28 is a block in which, after receiving the image data from the data converting section 26, the image data and the print data containing the print command are sent to the printing section 32, thereby causing the printing section 32 to execute a print job.

Note that when the stamp setting command is entered, the print instruction section 28 receives the composite image data from the image composition section 27 and sends the composite image data and a print command to the printing section 32, thereby causing the printing section 32 to execute a print job. That is, when the stamp setting command is entered, the printing section 32 prints on a sheet the composite image so that the image scanned by the scanner 33 is overlaid by the stamp mark.

Figure 11:
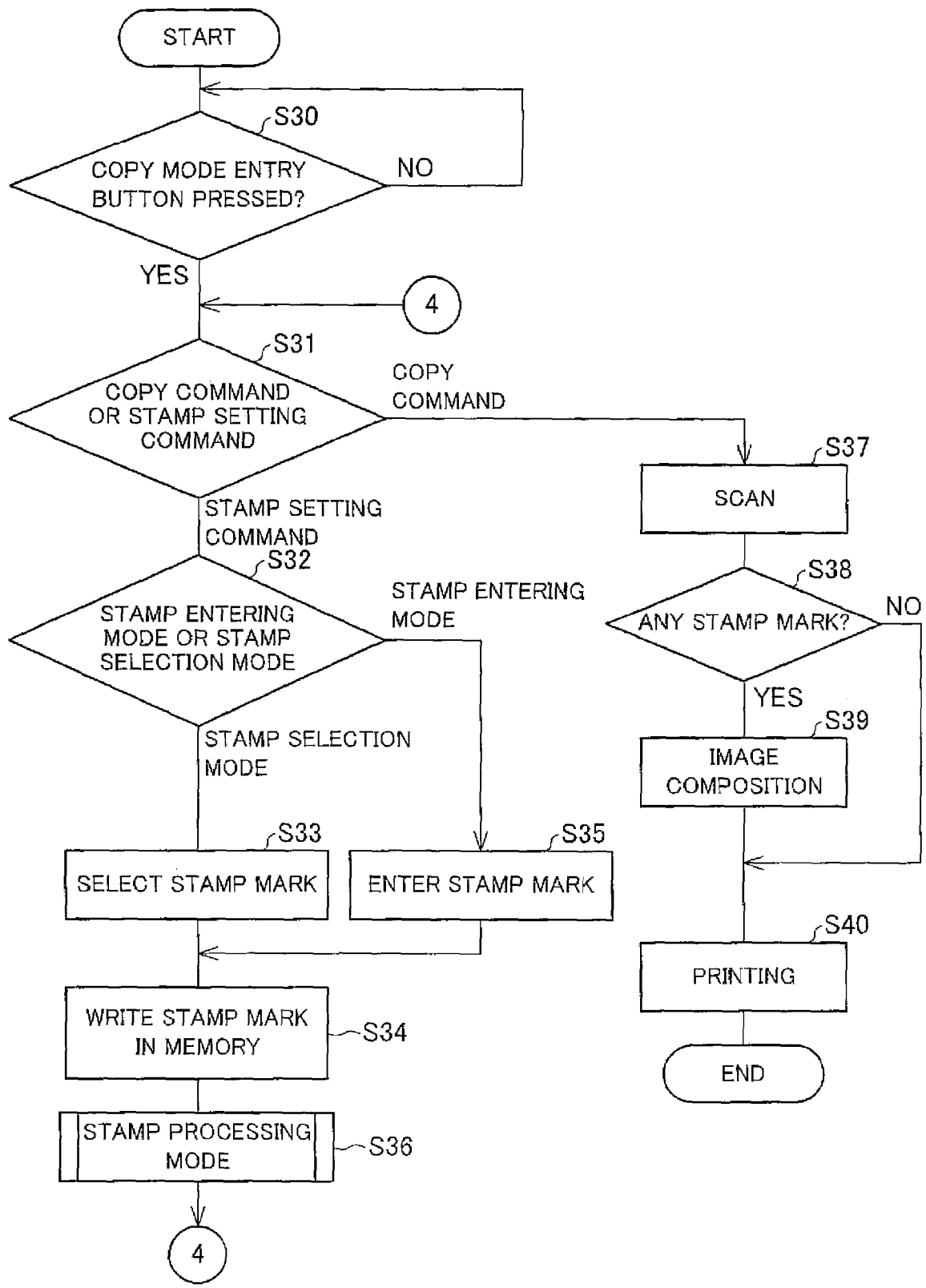
FIG. 11 is a flowchart illustrating a processing flow of a control unit of a multifunction printer of FIG. 10.

The following describes a processing flow of the control unit 120 with reference to a flowchart of FIG. 11. when a copy mode entry button (YES at S30) on the operating panel 34 of the multifunction printer 500 is pressed, the multifunction printer 500 enters into a standby status waiting for entering of a copy command or a stamp setting command (S31).

During the standby status at S31, a user can set job conditions for the copy process (print job) by operating the operating panel 34. The job conditions are set for every print job. For example, the job conditions include a condition of the number of print copies, a condition of page number, a condition of print direction (side-stapled or top-stapled), a condition of print side (single-sided or double-sided), a condition of paper size, a condition of toner density, etc.

When a user enters not a stamp setting command but a copy command in the multifunction printer 500 (S31 S37), the control apparatus 120 causes the scanner 33 to scan the image data of the original document (S37). The image data scanned by the scanner 33 is sent to the data converting section 26. The data converting section 26 converts the image data into the image data which is interpretable for the printing section 32.

Furthermore, the data converting section 26 proceeds to S38. Since no stamp mark is set here, S39 is omitted and S40 is proceeded (NO at s38). Specifically, the data converting section 26 sends the image data to the print instruction section 28, which image data was obtained from the scanner 33 and has been subjected to the conversion in the data converting section 26. The print instruction section 28 sends print data including the image data and a print command to the printing section 32, so that the printing section 32 is caused to execute the print job (S40). This causes the printing section 32 to print on a sheet the image scanned by the scanner 33 without combining with a stamp mark.

When the user enters a stamp setting command instead of entering a copy command at S31 (S31→S32), the stamp setting section 21 displays on the display section 12 the GUI for mode selection, which is illustrated in FIG. 2, and prompts the user to select either the "stamp entering mode" or the "stamp selection mode" (S32).

As FIG. 11 shows, S33 to S36 are proceeded after S32. Since S33 to S36 are the same as S6 to S9 in FIG. 8, respectively, descriptions for S33 to S36 are omitted here. FIG. 9 shows a subroutine for the stamp processing mode of S9 in FIG. 8 and also for the stamp processing mode of S36 in FIG. 11.

After the stamp processing mode of S36, S31 is proceeded. When the user enters a copy command in the control apparatus 120 at S31 (S31→S37), a copy setting mode ends. The control apparatus 120 causes the scanner 33 to scan the image data of the original document (S37). The image data scanned by the scanner 33 is sent to the data converting section 26. The data converting section 26 converts the image data into the image data which is interpretable for the printing section 32.

The data converting section 26 further proceeds to S38. Since the stamp mark is set here, S39 and S40 are proceeded in this order (YES at 838). Specifically, the data converting section 26 sends the image data to the image composition section 27, which image data was obtained from the scanner 33 and has been subjected to the conversion in the data converting section 26. The image composition section 27 prepares the composite image data (S39) by combining the image data received from the data converting section 26 and mark data indicated by the stamp mark processed by the image processing section 23, thereafter sending the composite image data thus prepared to the print instruction section 28.

The print instruction section 28 sends the composite image data and the print command to the printing section 32, so that the printing section 32 is caused to execute the print job (S40). Thus, the printing section 32 prints on a sheet the composite image so that the image scanned by the scanner 33 is overlaid by the stamp mark.

In also the present embodiment, in the scale process (S13), the rotation process (S18), and the trimming process (S23) of the stamp processing mode (S36) illustrated in FIG. 11, that area of the memory area 56 where a stamp mark that has not been subjected to one of these processes was written is overwritten with a stamp mark that has been subjected to the one of the processes. However, as in Embodiment 2, both the stamp mark that has been subjected to and has not subjected to each of the processes may be stored in the memory area 56 (see FIG. 13).

However, in such an arrangement in which, as illustrated in FIG. 13, both a stamp mark that has not been subjected to an image process (scale process, rotation process, or trimming process) and a stamp mark that has been subjected to the image process are stored in the memory area 56 every time the image process is performed with respect to the stamp mark, a free area in the memory 56 decreases as the number of the image processes with respect to the stamp mark increases. Therefore, this would result in a shortage of memory storage to store the stamp marks that have been subjected to the respective image process when performing the image processes with respect to stamp marks. In Embodiment 2, when the memory area 56 has no free area, an area where a stamp mark which has not been subjected to the image process was written is overwritten with a stamp mark which has been subjected to the image process.

Based on an operation in which unnecessary data in the memory area 56 is deleted when a copy command is entered, the multifunction printer 500 of the present embodiment may be arranged such that the image process of the stamp mark is halted at the point of the shortage of memory storage before entering the copy command and the image process is then restarted during scan process after a copy command is entered. The following describes a case in which the image process is performed with respect to a stamp mark during the scan process in the multifunction printer 500, with reference to FIG. 12.

Figure 12:
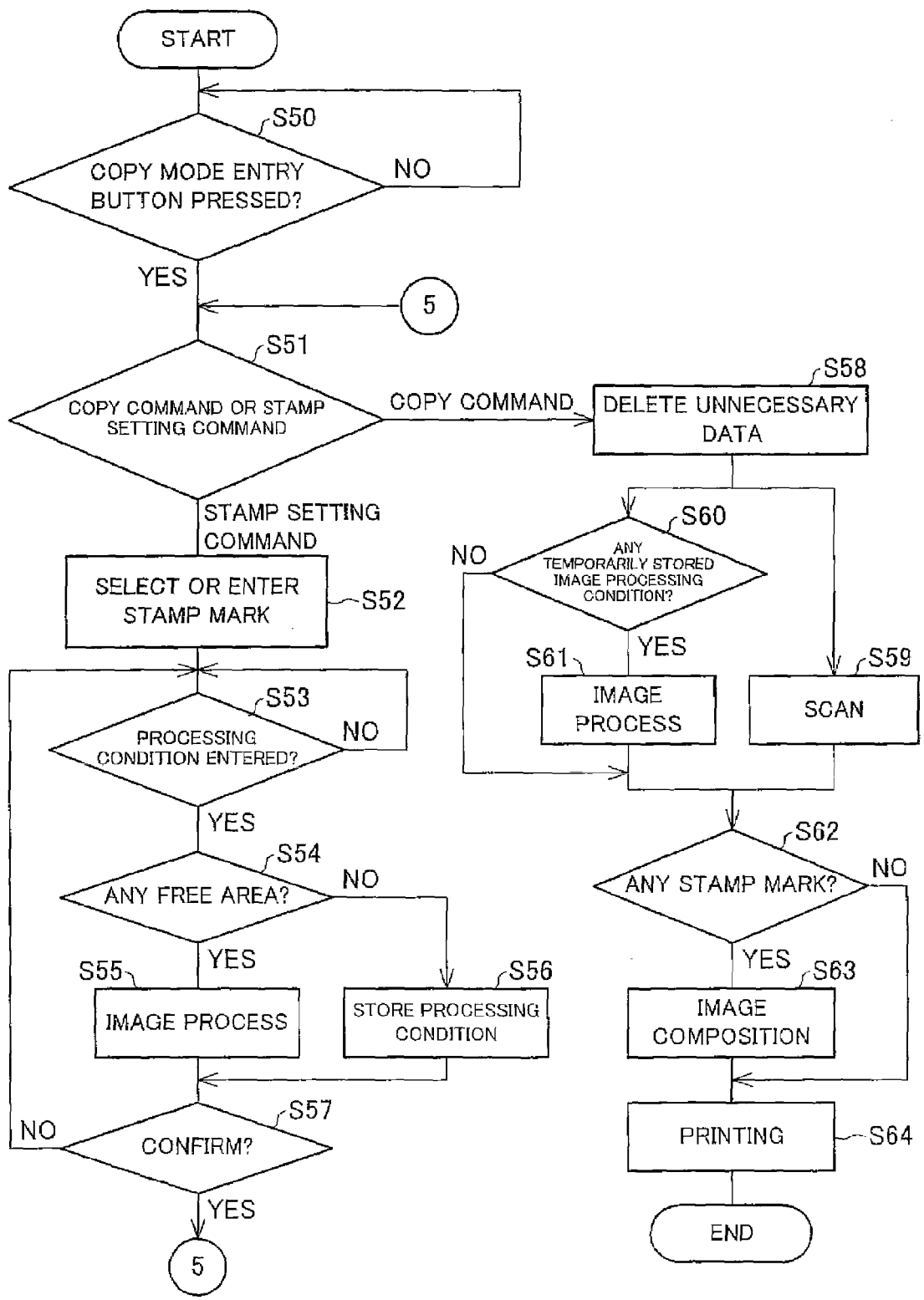
FIG. 12 is a flowchart illustrating a processing flow of the multifunction printer which performs image processes with respect to the stamp mark during a scan process.

FIG. 12 is a flowchart showing how the multifunction printer 500 performs the image processes with respect to a stamp mark during the scan process. S50 and S51 in FIG. 12 respectively correspond to S30 and S31 in FIG. 11. Also, S52 of FIG. 12 corresponds to S32 to S35 of FIG. 11. Therefore, descriptions for S50 to S52 are omitted.

When the user enters an image processing condition (a scaling factor, a rotation angle, or the like) after S52 (YES at S53), the control apparatus 120 determines whether or not the memory area 56 has a free area to store a stamp mark that has been subjected to the image process (S54).

For example, when it is determined that the memory area 56 has a free area (YES at S54) as illustrated in FIG. 13(a), the image processing section 23 performs the image process (the scale process, the rotation process, or the like) with respect to the stamp mark in accordance with the image processing condition entered at S53 (S55). Note that, without deleting the stamp mark that has not been subjected to the image process, the image processing section 23 writes at S55 the stamp mark that has been subjected to the image process in a different area of the memory area 56 from the area in which the stamp mark that has not been subjected to the image process is loaded.

Conversely, when it is determined that the memory area 56 has no free area (NO at S54), the control apparatus 120 causes the image processing section 23 to halt the image process and to temporarily store the image processing condition entered at S53 in the memory section 14 etc. (S56).

The user can repeat S53 to S56 until a confirmation command etc. is entered at S57 (NO at S57). In FIG. 12, a period between S53 and S57 corresponds to a period of the stamp processing mode (the processing condition accepting period).

Although the free area in the memory area 56 is not exhausted even when performing the image processes with respect to the stamp marks by several times in accordance with S53 to S57, the memory area 56 will have no free area as the number of the image processes (i.e., the number of repeating S55) increases. As such, after the memory area 56 has no free area, the control apparatus 120 temporarily forbids image process in accordance with the image processing condition entered by the user, and stores the image processing condition.

Thereafter, when a confirmation command etc. are entered at S57 (YES at S57) and a copy command is entered at S51, the control apparatus 120 deletes unnecessary data in the memory area 56 (S51→S58). The unnecessary data to be deleted here corresponds to the stamp mark(s) except the stamp mark obtained through the image process of the last S55 among repeatedly proceeded S55. For example, in cases where the memory area 56 stores (i) an original stamp mark B0, (ii) a stamp mark B1 that has been subjected to the first image process, (iii) a stamp mark B2 that has been subjected to the second image process, and (iv) a stamp mark B3 that has been subjected to the third (last) image process, the stamp marks B0, B1, and B2 are deleted from the memory area 56, thereby leaving the stamp mark B3 in the memory area 56.

After S58, the control unit 120 causes the scanner 33 to scan the image data of the original document (S59). During the process of S59, S61 may be performed by the control apparatus 120. The following description deals with S61.

After S58, the control apparatus 120 causes the scanner 33 to operate and determines whether or not there is an image processing condition temporarily stored at S56 (S60). If it is determined that there is no image processing condition temporarily stored (NO at S60), in other words, if it is determined that there is no image process temporarily forbidden by the control apparatus 120, then S61 is not proceeded.

Conversely, if it is determined that there is an image processing condition which is temporarily stored at S56 (YES at S60), in other words, if it is determined that there is an image process temporarily forbidden at S56, then the image processing section 23 performs the image process temporarily forbidden at S56 in accordance with the image processing condition temporarily stored at S56 (S61). The image processing section 23 writes the stamp mark that has been subjected to the image process at S61 in an area of the memory area 56 from which area the unnecessary data was deleted at S58.

After S59 and S61 are proceeded, S62 to S64 are proceeded. Since S62 to S64 are the same as S38 to S40, respectively, descriptions for S62 to S64 are omitted.

The multifunction printer (print control apparatus) 500, which performs the processes shown in FIG. 12, includes a control apparatus 120 and a memory area (memory) 56. The control apparatus 120 functions as a reading control section for causing the scanner 33 to perform reading process with respect to the image of an original document in response to the entering of a copy command (executive instruction). The control apparatus 120 includes a print instruction section (command section) 28 for setting the image, which is obtained through the reading process, as a print subject and causing the printing section (printer) 32 to print on a sheet the image, with a stamp mark overlaying the sheet. Furthermore, the control apparatus 120 functions as a deleting section (S58) which deletes, in response to the entering of a print command, at least a part of data stored in the memory area 56, which data has been stored until the reading process is started. The image processing section 23 in the control apparatus 120 has: a function as a storage capacity determination section (S54) that determines, before an image process is performed with respect to a stamp mark in the stamp processing mode (processing condition accepting period, S53 to S57), whether or not the memory area 56 has a free area to write a mark that has been subjected to the image process; a function as a first storage controlling section (S56) that causes the storage section 14 to store the processing condition if the memory area 56 has no free area; and a function as a halting section (S56) that halts the image process until the initiation of the reading process if the memory area 56 has no free area. The image processing section 23 has a function as a writing section (S61) that, during the reading process, writes in the memory area 56 a stamp mark that has been subjected to the image process, which has been halted by the halting section, and is performed in accordance with the processing condition stored in the storage section 14.

According to this arrangement, if the memory area 56 has no free area before the copy command is entered, the image process of the stamp mark is halted even if the processing condition for the stamp mark is entered. After the copy command is entered, the image process that has been halted is performed with respect to the stamp mark during the reading process. Thus, after the copy command is entered, the image process can be performed during the reading process because the free area in the memory area 56 is made by the entering of the copy command (S58), whereby the stamp mark that has been subjected to the image process can be written in the memory area 56. In this arrangement, the image process is performed with respect to the stamp mark after the copy command is entered. Since this image process is performed during the scan process, which is essential for copy process, the time required from the entering of the copy command to the end of printing will not become longer due to image processes even if the image process is performed after the copy command is entered.

When a rotation angle, which is a condition for the rotation process, is entered at S53 of FIG. 12, the rotation process is performed with respect to the stamp mark at S55. In this case, it is possible that the image processing section 23 may prepare two kinds of stamp marks, which are (i) a portrait stamp mark that has been subjected to the rotation process for a portrait original document and (ii) a landscape stamp mark that has been subjected to the rotation process for a landscape original document.

For example, in a case where, at S55, the rotation process is performed at a rotation angle of 20°, a portrait stamp mark (the fifth mark) is prepared by rotating 20° the original stamp mark and a landscape stamp mark (the sixth mark) is prepared by rotating (20+90)° the original stamp mark.

In a period between S62 and S63, the image composition section 27 determines based on the image data of the original document obtained by the scanning at S59 whether an original document is a portrait original document or a landscape original document. At S63, when the image composition section 27 determines that the original document is a portrait original document, the image composition section 27 combines data of the portrait stamp mark and the image data of the original document. When the image composition section 27 determines that the original document is a landscape original document, the image composition section 27 combines data of the landscape stamp mark and the image data of the original document.

By this, after the scanning, it is not necessary that the rotation process is performed at an rotation angle of 90° with respect to the stamp mark depending on whether the original document is a portrait one or a landscape one, regardless of whether the portrait original document or the landscape original document is scanned at S59. Therefore, it is possible to reduce the time required from the entering of the copy command to the end of printing. In contrast, in a case where a portrait stamp mark, for example, is solely prepared at S55, when a landscape original document is scanned at S59, it is necessary after the scanning that the rotation process is performed with respect to the portrait stamp mark at a rotation angle of 90°. This causes a problem that the time required from the entering of the copy command to the end of printing becomes longer.

The "portrait original document" indicates a rectangular original document placed such that the direction of a longer side of the rectangular original document is the same as a reference direction (a main scanning direction or a sub scanning direction) of the scanner 33. The "landscape original document" indicates a rectangular original document placed such that the direction of the longer side of the rectangular original document is orthogonal to the reference direction. The main scanning direction is a pixel array direction of the line CCD of the scanner 33. The sub scanning direction is a moving direction of the line CCD, which moving direction is orthogonal to the main scanning direction.

In each of the embodiments, the number of the original stamp marks to be stored in the server 40 or the memory section 14 is preferably about 20. Concrete examples of the stamp marks include "FOR INTERNAL USE ONLY," "TOP SECRET," which are mentioned above, "CONFIDENTIAL," "IMPORTANT," "CIRCULAR," "ASAP," "NEVER COPY," "DON'T COPY," "CO., LTD.," and "DIVISION."

A "LAN" in the printing system 100 of FIG. 1 or in the printing system 200 of FIG. 10 may be wired or wireless. Communications means in the printing systems 100 and 200 is not limited to the LAN, but may be a communications network other than the LAN. For example, the Internet, an intranet, an extranet, an ISDN, a VAN, a CATV network, a virtual private network, etc. can be used as the communication means. A transmission medium for the communications network is not especially limited, but can be, for example, IEEE1394, USB, power line communications, CATV lines, infrared rays such as IrDA and remote control, Bluetooth (trademark), or IEEE802.11 (wireless).

The terminal equipment 10 of FIGS. 1 and 10 is not limited to a personal computer connected to the LAN. Also, the terminal equipment 10 is not limited to a personal computer, provided that the terminal equipment 10 is a device including a computer which can remotely control the printer 30 or the multifunction printer 500. Examples of the terminal equipment 10 other than the personal computer include a PDA (personal digital assistant), a remote controller for operating through infrared communication the printer 30 and the multifunction printer 500.

Examples of the display section 12 of FIGS. 1 and 10 include a display apparatus such as a CRT (cathode ray tube), a liquid crystal display apparatus, a plasma display, an organic EL (electroluminescence) display, and an inorganic EL display.

Examples of the operating section 13 of FIG. 1 include a keyboard, a pointing device, and a ten key. An example of the display section 12 of FIG. 10 is a touch screen in which a touch panel is provided to cover the display apparatus. Examples of the operating section 13 of FIG. 10 include a keyboard and a ten key. Therefore, the display section 12 of FIG. 10 has not only a function of displaying information but also a function of entering information.

Examples of the memory section 14 of FIGS. 1 and 10 include an internal/external hard disk drive, a ROM (Read Only Memory), and a removable recording medium. It is not necessary that the memory section 14 is provided in the terminal equipment 10 or the multifunction printer 500. Alternatively, the memory section 14 may be a hard disk drive connected to the LAN.

The controlling section 11 of FIG. 1 or the control apparatus 120 of FIG. 10 is composed of a PC-based computer. Each of the processes of the controlling section 11 or the control apparatus 120 is performed through execution of programs by an arithmetic circuit such as a processor. The programs may be recorded in a removable medium such as a CD-ROM (computer-readable recording medium) and read out therefrom to be used. The programs may also be recorded in a hard disk or a ROM and read out therefrom to be used. In addition, in a case of an arrangement in which the controlling section 11 or the control apparatus 120 is connected to a communications network such as the Internet, it is possible to present an arrangement in which the programs are downloaded via the communications network and installed on the hard disk etc. to be executed.

A print control apparatus of the present invention including command means for causing a printing apparatus to execute a print job, in response to an input of an executive instruction of the print job, which print job causes a print subject image to be printed on a sheet, with a mark overlaying the sheet, includes: accepting means for accepting a processing condition for an image process of the mark, during a processing condition accepting period, which is set for every print job and is the period before the executive instruction is entered; and image processing means for performing the image process of the mark in accordance with the processing condition during the processing condition accepting period.

According to an arrangement of the present invention, the image processes of the mark are complete at the point of the entering of the execution command because the image processes of the mark are performed during the processing condition accepting period. As a result, the image processes of the mark do not have to be performed after the entering of the execution instruction. This makes it possible to prevent the delay in the initiation of printing because a time between the entering of the execution instruction and the initiation of printing can be reduced in contrast with an arrangement in which the image processes are performed on the mark after the entering of the execution instruction.

The processing condition accepting period is a period which is set for every print job. Therefore, according to the arrangement of the present embodiment, even if processing conditions for a stamp mark differ from print job to print job, it is always possible to prepare a stamp mark that has been processed under the processing conditions. Thus, the arrangement of the present embodiment gives rise to an effect of suppressing a delay in the initiation of print process, without excessive consumption of memory storage of a storage device. This is because it is not necessary to store, in advance, in the storage device as many stamp marks as possible on the assumption that various processing conditions are to be entered by a user. This is unlike Patent Document 1.

As to an image forming apparatus according to Patent Document 1, when performing printing with a stamp mark not stored in the storage device but entered by a user, the image processes are performed on the stamp mark merely after the entering of the print command. This accordingly results in the delay in the initiation of printing.

The mark here indicates a mark to be printed on a sheet together with a print subject image, the mark overlaying the sheet. Such marks are letters, pictures, patterns, etc. The mark may be referred to as stamp mark or watermark. The "image to be printed" above is an image which is prepared in order to be printed on a sheet. That is, the image to be printed indicates an image prepared with various applications (word-processing software, drawing software, etc.), an image captured with a digital camera, an image scanned by a scanner, and various electronic documents.

The print control apparatus of the present invention may be arranged such that the image processing means performs the image process upon an acceptance of the processing condition by the accepting means. According to the arrangement, since the image process according to the processing condition is performed with respect to the mark in substantially sync with the acceptance of the processing condition, it is possible to perform the image process with respect to the mark before the executive instruction is entered (i.e., during the processing condition accepting period).

The print control apparatus of the present invention may be arranged such that, without deleting from a memory a pre-processing mark that has not been subjected to the image process, the image processing means writes in the memory a post-processing mark that has been subjected to the image process. According to the arrangement, even if a user performed the image process by mistake, the pre-processing mark does not have to be regenerated by performing the image process on the post-processing mark because the pre-processing mark is remained in the memory. This accordingly makes it possible to reduce the processing burden of a computer.

The print control apparatus of the present invention may be arranged such that, when the accepting means accepts a first processing condition and a second processing condition in this order, the image processing means: without deleting from the memory a first mark which has not been subjected to a first image process in accordance with the first processing condition, writes in the memory a second mark which is obtained by performing a first image process with respect to the first mark, and without deleting the first mark and the second mark from the memory, writes in the memory (i) a third mark obtained by performing the second image process with respect to the first mark in accordance with the second processing condition and (ii) a fourth mark obtained by performing the second image process with respect to the second mark.

According to the arrangement, when the first processing condition and the second processing condition are entered, written in the memory are not only the fourth mark which has been subjected to the first image process according to the first processing condition and the second image process according to the second processing condition but also (i) the first mark which has not been subjected to the first image process and the second image process, (ii) the second mark which has been subjected to the first image process but the second image process, and (iii) the third mark which has been subjected to the second image process but the first image process. Accordingly, for example, in a case where a user entered the first processing condition and the second processing condition but wished, in reality, to obtain either (i) the third mark that has been subjected merely to the second image process under the second processing condition, (ii) the second mark that has been subjected merely to the first image process under the first processing condition, or (iii) the first mark that has not been subjected to the first image process and the second image process, it is not necessary to prepare again the first mark, the second mark, or the third mark. This makes it possible to reduce the processing burden of a computer.

The print control apparatus of the present invention may be arranged such that, before performing the image process, the image processing means determines whether or not the memory has a free area to write the post-processing mark that has been subjected to the image process; and if the image processing section determines that the memory has no free area, then the image processing section overwrites the post-processing mark that has been subjected to the image process in an area where the pre-processing mark that has not been subjected to the image process is written. According to the arrangement, even if the free area in the memory becomes small, it is possible to secure a memory capacity to store the mark which has been subjected to the image process by deleting the mark which has not been subjected to the image process. This makes it possible to perform the image process according to an entered image processing condition, without problems.

The print control apparatus of the present invention may include a reading control section that causes a scanner to perform a reading process of an image of an original document, in response to an input of the executive instruction, wherein the command section sets an image obtained through the reading process as the image to be printed. The print control apparatus of the present invention may include: a memory; and deleting means for deleting, before initiation of the reading process, at least a part of data stored in the memory in response to an input of the executive instruction, the image processing means including: means for determining, before the image process is performed, whether or not the memory has a free area to write a mark that has been subjected to the image process; means for causing a storage section to store the processing condition when the storage capacity determination section determines the memory has no free area; means for halting the image process until the initiation of the reading process when the storage capacity determination section determines that the memory has no free area; and means for writing, during the reading process, in the memory the mark that has been subjected to the image process, which image process is performed in accordance with the processing condition stored in the storage section.

According to the arrangement, even if the memory has no free area before the executive instruction is entered, the free area is created by entering the executive instruction. Therefore, the mark which has been subjected to the image process can be written in the memory after entering the executive instruction. For that reason, when the memory has no free area before entering the executive instruction, the image process is halted even if the image processing condition has been accepted. An image process thus halted is performed during the reading process after entering the executive instruction. According to this arrangement, the image process is performed on the mark after entering the executive instruction. However, since this image process is performed during the reading process, which is an essential process after the executive instruction, the time between the entering of the executive command and the initiation of printing does not become longer due to the image process of the mark. Therefore, the delay in the initiation of printing can be prevented.

The print control apparatus of the present invention may be arranged such that the image process is a rotation process and the processing condition is a rotation angle for the rotation process; and the image processing means prepares a fifth mark obtained by rotating the mark by the rotation angle and a sixth mark obtained by rotating the mark by an angle of the rotation angle plus 90°.

According to this arrangement, the rotation process is performed on the mark before the reading process. With both a mark which has been subjected to the rotation process for a portrait original document and a mark which has been subjected to the rotation process for a landscape original document (the fifth and six mark), which are prepared before entering the executive instruction, the rotation process at a rotation angle of 90° does not have to be performed with respect to the mark depending on whether the original document is a portrait one or a landscape one after the reading process, regardless of whether the portrait original document or the landscape original document is scanned during the reading process. This accordingly makes it possible to prevent the delay in the initiation of printing due to the rotation process at a rotation angle of 90° after the reading process.

The portrait original document indicates a rectangular original document placed such that the direction of a longer side of the rectangular original document is the same as a reference direction (a main scanning direction or a sub scanning direction) of the scanner. The "landscape original document" indicates a rectangular original document placed such that the direction of the longer side of the rectangular original document is orthogonal to the reference direction.

The print control apparatus of the present invention may be arranged such that the image process includes a first process and a second process whose kinds are different from each other; the accepting means accepts a first condition which is a processing condition for the first process during a first period in which the first condition is acceptable, and accepts a second condition which is a processing condition for the second process during a second period in which the second condition is acceptable; and the image processing means performs the first process during the first period, and performs the second process during the second period.

The print control apparatus of the present invention may be arranged such that the image process is a rotation process, a scale process, or a trimming process; and the processing condition is (i) a rotation angle of the mark, where the image process is the rotation process, (ii) a scaling factor of the scale process, where the image process is the scale process, or (iii) information specifying an area of the mark, the area to be trimmed, where the image process is the trimming process.

The print control apparatus of the present invention may include: format determination means for determining a format of the image based on image data indicative of the image; storage controlling means for controlling the storage section to store (i) format information indicative of the format, which format is determined by the format determination section and (ii) the mark that has been subjected to the image process of the image processing section so that the format information and the mark are correlated with each other; and readout means for reading out, when the format information is entered, from the storage section the mark correlated with the format information thus entered, the command means causing the printing apparatus to execute a print job which causes the print subject image to be printed on the sheet, with a mark overlaying the sheet, the mark read out by the readout means. This arrangement gives a user the following convenience. Namely, in cases where there is a stamp mark with which a specific format such as "weekly report" is always combined, the stamp mark is read out merely by entering format information.

The print control apparatus of the present invention may include display controlling means for (i) displaying on a display device before the image process a pre-processing mark and a first identifying information indicating the pre-process mark, (ii) displaying on the display device after the image process a post-processing mark and a second identifying information indicating the post-processing mark, (iii) displaying on the display device the pre-processing mark in response to an input of the first identifying information, and (iv) displaying on the display device the post-processing mark in response to an input of the second identifying information, where the pre-processing mark is a mark that has not been subjected to the image process and the post-processing mark is a mark that has been subjected to the image process. By this arrangement, even if the image processes are performed, on wrong processing conditions, with respect to a mark, a user can make the display device redisplay immediately the mark which has not been subjected to the image processes based on the wrong processing conditions.

In order to attain the object, in the present invention, a print control apparatus which causes a scanner to perform a reading process with respect to an image of an original document and causes a printing apparatus to perform a process for printing on a sheet the image thus obtained through the reading process and a mark in a superimposed manner, includes: accepting means for accepting a processing condition for an image process of the mark before the reading process; and image processing means for performing the image process of the mark in accordance with the processing condition during the reading process. Since this image process is performed during the scan process, the time required from the entering of the executive instruction to the end of printing will not become longer due to image processes even if the image process is performed after the executive instruction is entered. Therefore, the delay in completion of printing can be prevented.

Moreover, the present invention may be expressed as a printing system including the print control apparatus and the printing apparatus. The present invention may be also expressed that a print control method including a command step for causing a printing apparatus to execute a print job, in response to an input of an executive instruction of the print job, which print job causes a print subject image and a mark to be printed on a sheet in a superimposed manner, includes: an accepting step for accepting a processing condition for an image process of the mark, during a processing condition accepting period, which is set for every print job and is the period before the input of the executive instruction; and an image processing step for performing the image process of the mark in accordance with the processing condition during the processing condition accepting period.

The present invention may be realized with a computer. In this case, the present invention includes a control program causing the computer function as a print control apparatus, the control program which makes the computer function as the accepting means and the image processing means, and a computer-readable recording medium storing the control program.

The present invention is not limited to the description of the embodiments above, but may be altered by a skilled person within the scope of the claims. An embodiment based on a proper combination of technical means disclosed in different embodiments is encompassed in the technical scope of the present invention.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. A print control apparatus, comprising:
   a command section that causes a printing apparatus to execute a print job, in response to an input of an executive instruction of the print job, which print job causes a print subject image to be printed on a sheet, with a mark overlaying the sheet;
   an accepting section that accepts a processing condition for an image process of the mark, during a processing condition accepting period, which is set for every print job and is the period before the input of the executive instruction;
   an image processing section that performs the image process of the mark in accordance with the processing condition during the processing condition accepting period;
   the image processing section performing the image process upon an acceptance of the processing condition by the accepting section, and
   when the accepting section accepts a first processing condition to be applied to a whole of the mark and a second processing condition to be applied to a whole of the mark in this order,
   the image processing section:
   without deleting from a memory a first mark which is the mark and which has not been subjected to a first image process in accordance with the first processing condition and has not been subjected to a second image process in accordance with the second processing section, writing in the memory a second mark which is obtained by performing the first image process with respect to the first mark, and without deleting the first mark and the second mark from the memory, writing in the memory (i) a third mark obtained by performing a second image process with respect to the first mark in accordance with the second processing condition, and (ii) a fourth mark obtained by performing the second image process with respect to the second mark.

2. The print control apparatus as set forth in claim 1, wherein:

before performing the image process, the image processing section determines whether or not the memory has a free area to write the post-processing mark that has been subjected to the image process; and if the image processing section determines that the memory has no free area, then the image processing section overwrites the post-processing mark that has been subjected to the image process in an area where the pre-processing mark that has not been subjected to the image process is written.

3. The print control apparatus as set forth in claim 1, further comprising:

a memory; and a deleting section that deletes, before initiation of the reading process, at least a part of data stored in the memory in response to an input of the executive instruction, the image processing section including:

a storage capacity determination section that determines, before the image process is performed, whether or not the memory has a free area to write a mark that has been subjected to the image process;

a first storage controlling section that causes a storage section to store the processing condition when the storage capacity determination section determines that the memory has no free area;

a halting section that halts the image process until the initiation of the reading process when the storage capacity determination section determines that the memory has no free area; and a writing section that, during the reading process, writes in the memory the mark that has been subjected to the image process, which image process is performed in accordance with the processing condition stored in the storage section.

4. The print control apparatus as set forth in claim 1, wherein:

the image process is a rotation process and the processing condition is a rotation angle for the rotation process; and the image processing section prepares a fifth mark obtained by rotating the mark by the rotation angle and a sixth mark obtained by rotating the mark by an angle of the rotation angle plus 90°.

5. The print control apparatus as set forth in claim 1, wherein:

the image process includes a first process and a second process whose kinds are different from each other;

the accepting section accepts a first condition which is a processing condition for the first process during a first period in which the first condition is acceptable, and accepts a second condition which is a processing condition for the second process during a second period in which the second condition is acceptable; and the image processing section performs the first process during the first period, and performs the second process during the second period.

6. The print control apparatus as set forth in claim 1, wherein:

the image process is a rotation process, a scale process, or a trimming process; and the processing condition is (i) a rotation angle of the mark, where the image process is the rotation process, (ii) a scaling factor of the scale process, where the image process is the scale process, or (iii) information specifying an area of the mark, the area to be trimmed, where the image process is the trimming process.

7. The print control apparatus as set forth in claim 1, further comprising:

a format determination section that determines a format of the image based on image data indicative of the image;

a second storage controlling section that controls the storage section to store (i) format information indicative of the format, which format is determined by the format determination section and (ii) the mark that has been subjected to the image process of the image processing section so that the format information and the mark are correlated with each other; and a readout section that, when the format information is entered, reads out from the storage section the mark correlated with the format information thus entered, the command section causing the printing apparatus to execute a print job which causes the print subject image to be printed on the sheet, with a mark overlaying the sheet, the mark read out by the readout section.

8. The print control apparatus as set forth in claim 1, further comprising:

a display controlling section that (i) displays on a display device before the image process a pre-processing mark and a first identifying information indicating the pre-process mark, (ii) displays on the display device after the image process a post-processing mark and a second identifying information indicating the post-processing mark, (iii) displays on the display device the pre-processing mark in response to an input of the first identifying information, and (iv) displays on the display device the post-processing mark in response to an input of the second identifying information, where the pre-processing mark is a mark that has not been subjected to the image process and the post-processing mark is a mark that has been subjected to the image process.

9. A printing system, comprising a printing apparatus and a print control apparatus for controlling the printing apparatus, the print control apparatus including:

a command section that causes a printing apparatus to execute a print job, in response to an input of an executive instruction of the print job, which print job causes a print subject image to be printed on a sheet, with a mark overlaying the sheet;

an accepting section that accepts a processing condition for an image process of the mark, during a processing condition accepting period, which is set for every print job and is the period before the input of the executive instruction; and an image processing section that performs the image process of the mark in accordance with the processing condition during the processing condition accepting period;

the image processing section performing the image process upon an acceptance of the processing condition by the accepting section, and when the accepting section accepts a first processing condition to be applied to a whole of the mark and a second processing condition to be applied to a whole of the mark in this order, the image processing section:

without deleting from a memory a first mark which is the mark and which has not been subjected to a first image process in accordance with the first processing condition and has not been subjected to a second image process in accordance with the second processing condition, writing in the memory a second mark which is obtained by performingthe first image process with respect to the first mark, and without deleting the first mark and the second mark from the memory, writing in the memory (i) a third mark obtained by performing a second image process with respect to the first mark in accordance with the second processing condition, and (ii) a fourth mark obtained by performing the second image process with respect to the second mark.

\* \* \* \* \*